United States Patent
Otome

[19]
[11] Patent Number: 5,992,358
[45] Date of Patent: Nov. 30, 1999

[54] SCAVENGE SYSTEM FOR TWO CYCLE ENGINES

[75] Inventor: Kimitake Otome, Iwata, Japan

[73] Assignee: Yamaha Hatsudoki Kabushiki Kaisha, Iwata, Japan

[21] Appl. No.: 09/038,027

[22] Filed: Mar. 11, 1998

[30] Foreign Application Priority Data

Mar. 17, 1997 [JP] Japan .................................. 9-063545
Mar. 25, 1997 [JP] Japan .................................. 9-071513

[51] Int. Cl.$^6$ ...................................................... F02B 25/18
[52] U.S. Cl. .................................. 123/65 P; 123/65 PD; 123/73 BA
[58] Field of Search .......................... 123/65 P, 65 PD, 123/73 BA, 65 WA, 73 B

[56] References Cited

U.S. PATENT DOCUMENTS

| | | | |
|---|---|---|---|
| 1,310,906 | 7/1919 | De Aburto | 123/65 WA |
| 1,520,620 | 7/1924 | Wall | 123/65 P |
| 1,622,717 | 3/1927 | Hildebrand | 123/65 P |
| 2,085,035 | 6/1937 | Meredith | 123/65 WA |
| 2,113,979 | 4/1938 | Bokemuller | 123/65 W |
| 3,074,388 | 1/1963 | Kruckenberg | 123/65 P |
| 3,425,399 | 2/1969 | Ward et al. | 123/65 WA |
| 3,858,562 | 1/1975 | Lanpheer | 123/65 P |
| 4,088,098 | 5/1978 | Rose et al. | 123/65 PD |
| 4,184,462 | 1/1980 | Hale | 123/54.6 |
| 4,305,361 | 12/1981 | Perry | 12/65 P |
| 4,362,132 | 12/1982 | Neuman | 123/65 P |
| 4,445,468 | 5/1984 | Onishi et al. | 123/73 B |
| 4,458,636 | 7/1984 | Kania | 123/65 P |
| 4,643,140 | 2/1987 | Whipple | 123/65 P |
| 4,821,687 | 4/1989 | Iwai | 123/65 P |
| 5,107,810 | 4/1992 | Wu et al. | 123/65 PD |
| 5,671,703 | 9/1997 | Otome et al. | 123/65 P |
| 5,740,767 | 4/1998 | Kaku et al. | 123/73 B |

*Primary Examiner*—Noah P. Kamen
*Assistant Examiner*—Jason Benton
*Attorney, Agent, or Firm*—Knobbe, Martens, Olson & Bear LLP

[57] ABSTRACT

A number of embodiments of two cycle crankcase compression internal combustion engines having at least two cylinders in a common bank in side-by-side relationship. Each embodiment incorporates a main Schnurle type scavenging system that includes a pair of main scavenge passages on opposite sides of the exhaust passage that terminate in main scavenge ports that are disposed in proximity to and on opposite sides of the exhaust port. A transversely extending supplemental scavenge passage is provided for delivering a charge to the combustion chamber to somewhat restrict the scavenging flow so as to prevent fuel from passing out of the exhaust port. Fuel is injected into proximity with this supplemental scavenge passage. This facilitates stratification of the fuel charge. The ports are rotated from normal around the cylinder bore axis in many embodiments to provide a more compact construction. Even in those embodiments where this is not done, the fuel injectors are mounted so that they can be easily accessed from outside of the engine body. Various applications for the engine such as a motorcycle, personal watercraft and outboard motor are depicted.

36 Claims, 20 Drawing Sheets

SCAVENGE SYSTEM FOR TWO CYCLE ENGINES

BACKGROUND OF THE INVENTION

This invention relates to two cycle engines and more particularly to an improved porting arrangement for such engines.

As is well known, two cycle engines are very popular because their ported nature makes them very simple. In addition, the firing of the cylinder for each revolution increases the specific output of the engine. However, there are a number of problems in connection with the utilization of ported engines.

One of the major problems deals with the fact that the intake cycle takes place at the same time and substantially overlaps the exhaust cycle. In fact, the intake cycle is utilized to purge the exhaust gases from the cylinder through a process that is commonly referred to as "scavenging."

However, when the scavenging is employed in an engine, there is a risk that the fresh air charge may also pass out of the exhaust port with some of the exhaust gases. This problem is particularly troublesome if fuel is also mixed with the exhausted mixture before it has had an opportunity to bum.

One popular type of scavenging system employed with two cycle engines is the Schnurle type. With Schnurle type scavenging, one or more scavenge ports are placed in proximity to the exhaust port. The flow of air into the combustion chamber from the scavenge ports is directed toward the opposing side of the cylinder wall for redirection upwardly and across the cylinder head. The charge then flows back downwardly to the exhaust port. This type of scavenging also uses, at times, an auxiliary scavenging port that is directly opposed to the exhaust port. Although this type of scavenging is very effective, there nevertheless is some concern that the fresh charge may pass out of the exhaust port.

A scavenging type of system has been proposed that employs a supplemental scavenge or tumble port that are disposed transversely to the main scavenge ports. This port introduces a tumble flow into the cylinder on the side facing away from the exhaust port. This permits the attainment of stratification and also improves or reduces the likelihood that fuel will pass out of the exhaust port. A construction of this type is shown in U.S. Pat. No. 5,671,703, issued Sep. 30, 1997 and assigned to the assignee hereof.

Although the system shown in that patent is very effective, there still seem to be ways to further improve performance. For example, it has been found that the utilization of tumble although helpful is not always desirable. There is, however, desire to at least redirect the scavenge flow from the main scavenge ports so that the charge is directed somewhat away from the side opposite to the exhaust port.

It has also been found that a scavenging system as described can very useful in achieving stratification if fuel is injected into the stream of air circulated from the supplemental scavenging port. In fact, in some instances it may be desirable to inject the fuel into the scavenging passage serving this port. Thus there are disclosed several improved arrangements in my copending application entitled Porting Arrangement for Two Cycle Engine, Ser. No. 09/038,388, filed concurrently herewith and assigned to the assignee hereof (Attorney Docket No. YAMAH4.554A) which are intended to improve stratification.

Although the arrangements shown in that concurrently filed application are particularly useful in achieving stratification, it is believed that further improvements are desirable. For example, the embodiments shown in that application all attempt to achieve stratification in a generally open combustion chamber.

The use of an open combustion chamber is desirable. However, with two-cycle engines it is very difficult to achieve stratification. The reason for this is that because of the fact that scavenging is taking place simultaneously with the exhaust of gases from the combustion chamber and the time period for achieving this is relatively small, mixing of the intake charge and fuel with the exhaust charge is difficult to avoid.

It is, therefore, a principal object of this invention to provide an improved combustion chamber and porting arrangement for an engine wherein fuel stratification can be achieved without sacrificing effective scavenging.

It is a still further object of this invention to provide an improved scavenging and stratification arrangement for a two-cycle internal combustion engine.

SUMMARY OF THE INVENTION

The features of this invention are adapted to be embodied in a two cycle internal combustion engine having a cylinder block that defines a cylinder. A piston reciprocates in cylinder bore to form with the cylinder bore and the cylinder head a combustion chamber. An exhaust port is formed in the cylinder bore at the inlet end of a respective exhaust passage that is formed in the cylinder block and which is opened and closed by the reciprocation of the respective piston. A pair of circumferentially spaced scavenge ports are formed in the cylinder bore at spaced locations from the exhaust port and are served by respective scavenging passages configured so as to create a scavenging air flow. The piston has a head portion that defines a dividing wall disposed between the scavenge ports for at least a portion of the stroke of the piston. Means introducing a substantial fuel charge into the combustion chamber on one side of the wall during at least a portion of the time of fuel delivery

DETAILED DESCRIPTION OF THE PREFERRED EMBODIMENTS OF THE INVENTION

Figure 1:
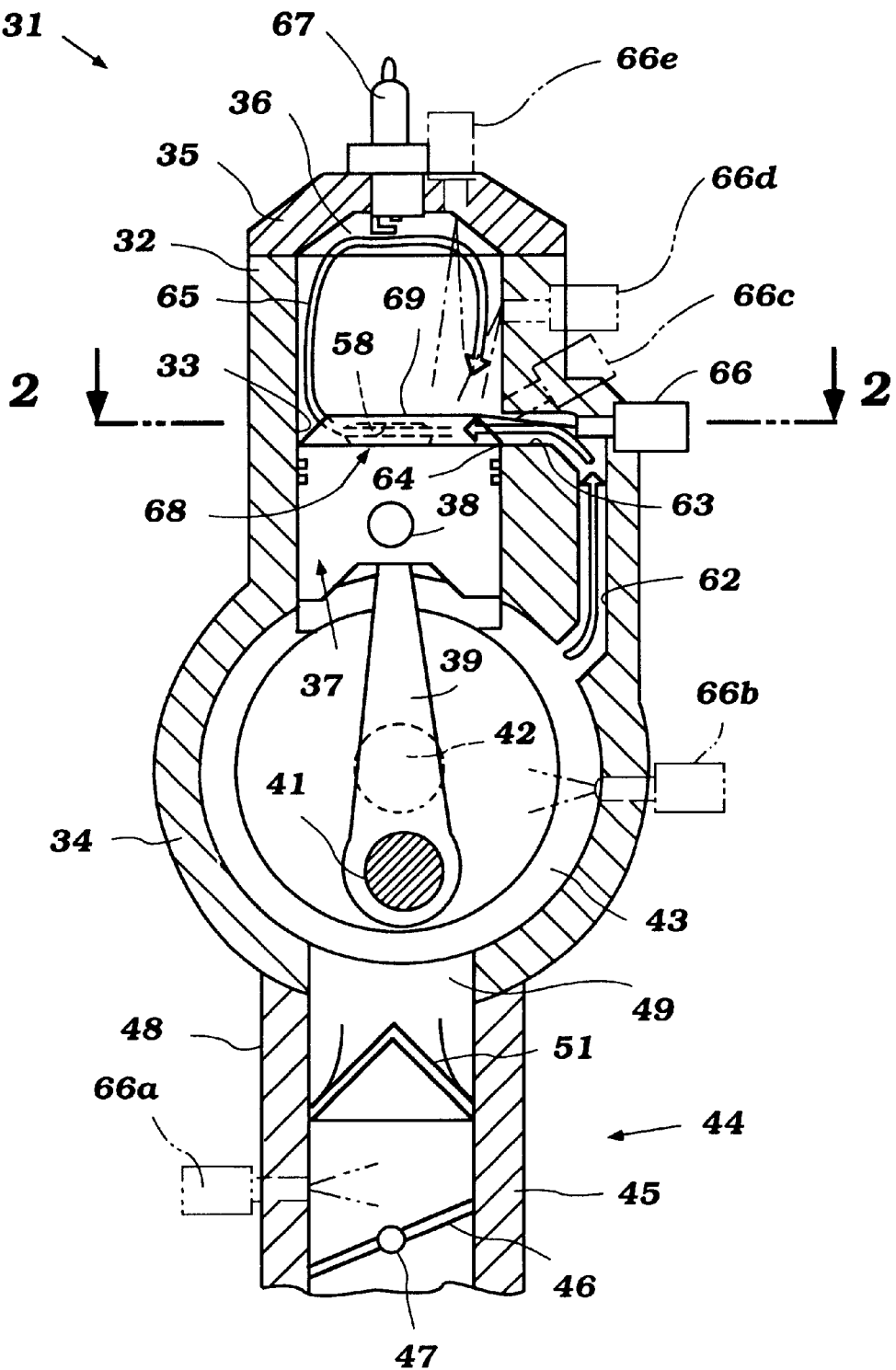
FIG. 1 is a cross-sectional view taken through a single cylinder of an engine constructed in accordance with an embodiment of the invention and is taken generally along the line 1—1 of FIG. 2.

Referring now in detail to the drawings and first to the embodiment of FIGS. 1–5, a single cylinder, two-cycle, crankcase compression internal combustion engine constructed in accordance with this embodiment is identified generally by the reference numeral 31. The invention is described in conjunction with a single cylinder engine because it is believed that those skilled in the art will readily understand how the invention can be employed with engines having varying numbers of cylinders and varying cylinder configuration. In fact, a multi-cylinder embodiment is shown in the embodiment of FIGS. 20–23.

The engine 31 is comprised of a cylinder block 32 that defines a cylinder bore 33. One end of the cylinder bore 33 is closed by a crankcase member 34 which is depicted as being formed integrally with the cylinder block 32 but which, of course, may be formed by one or more separate members that are attached to the cylinder block 32. Such constructions are well known in the art.

The other end of the cylinder bore 33 is closed by a cylinder head 35 which may be detachably affixed to the cylinder block 32 as shown or may be formed integrally with it. The cylinder head 35 is formed with a recess 36. This recess 36 is in facing relationship to the cylinder bore 33 and forms the combustion chamber along with a piston, indicated generally by the reference numeral 37 which reciprocates in the cylinder bore 33. Because at top dead center, the cylinder head recess 36 forms the major portion of the combustion chamber, at times, the combustion chamber will be referred to by this reference numeral.

The piston 37 is connected by means of a piston pin 38 to the upper or small end of a connecting rod 39. The large or big end of the connecting rod 39 is journalled on a throw 41 of a crankshaft 42. The crankshaft 42 is rotatably journalled within a crankcase chamber 43 that is formed by the crankcase member 34.

An intake air charge is delivered to the crankcase chamber 43 by an induction system which is shown in primary part schematically and which is indicated generally by the reference numeral 44. This induction system includes an air inlet device (not shown) that draws atmospheric air and may include a silencing and/or filtering arrangement. This air is then delivered to a throttle body 45 in which a flow controlling valve 46 is positioned. The throttle valve 46 is mounted on a throttle valve shaft 47 and is operated in any known manner.

The throttle body 45 cooperates with an intake manifold 48 that delivers the air charge inducted to the crankcase chamber 43 through an intake port 49.

As is typical with two-cycle crankcase compression engine practice, a reed-type check valve 51 is positioned in the intake manifold 48 at the intake port 49. The reed-type valve permits the air charge to enter the crankcase chamber 43 at the time when its volume is expanding due to the upward movement of the piston 37 in the cylinder bore 33. However, when the piston 37 moves downwardly to compress the charge in the crankcase chamber 43, the compressed charge is then transferred to the combustion chamber 36 for further compression. This is done by a scavenging system that will be described primarily by reference to FIGS. 1–4.

This scavenging system comprises a pair of main scavenging ports 52 that are positioned on diametrically opposite sides of the cylinder bore 33. These main scavenge passages 52 communicate at their inlet ends with the crankcase chamber 43. The outlet ends of the scavenge passages 52 communicate through the cylinder bore 33 through main scavenge ports 53.

Figure 4:
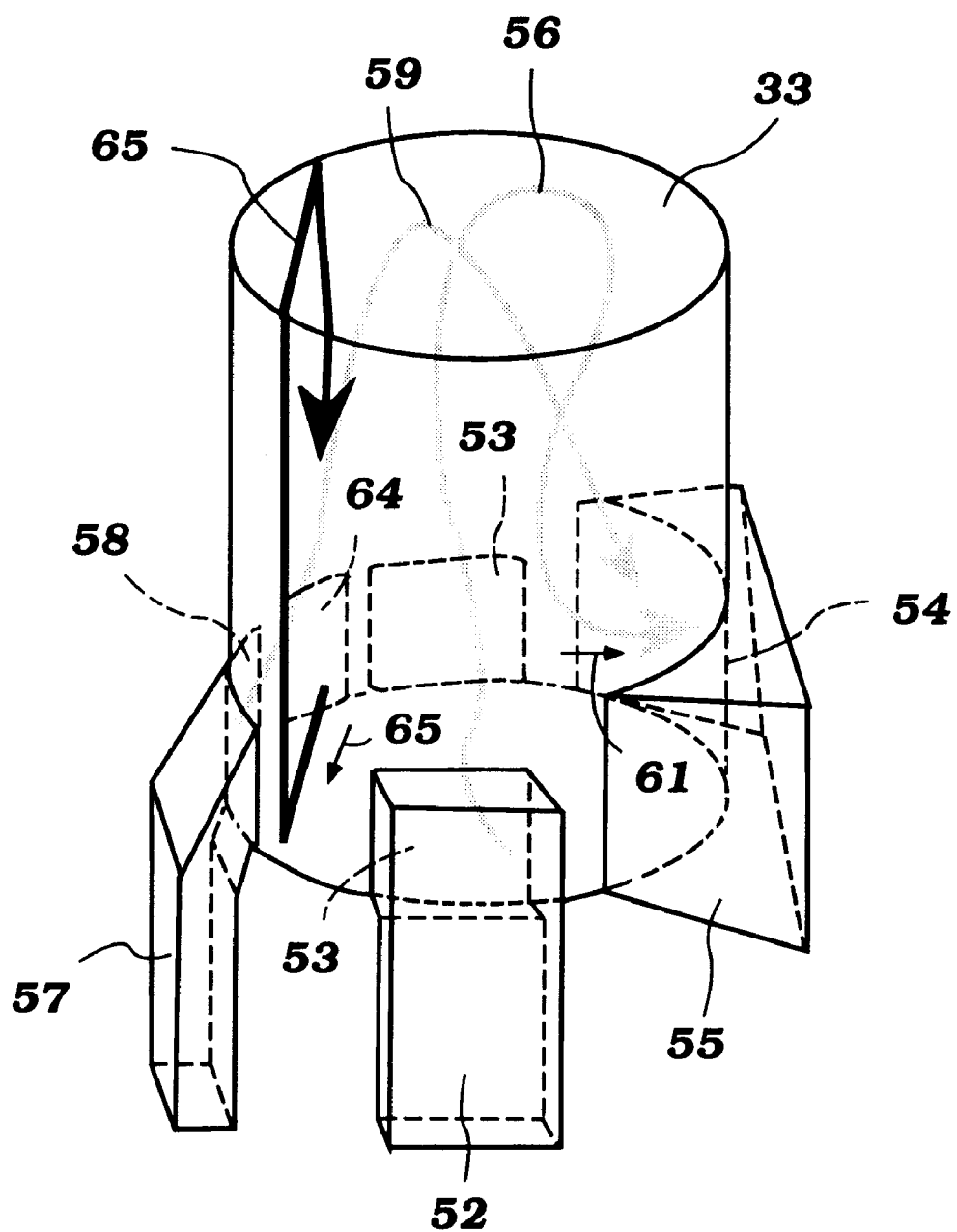
FIG. 4 is a perspective view showing the airflow path into the combustion chamber through the various scavenge ports and also the exhaust path out of the exhaust port.

As may be best seen in FIG. 4, the main scavenge passages 52 and scavenge port 53 are configured so that the charge which issues from them will flow generally upwardly along the axis of the cylinder bore 33 toward the cylinder head recess 36. There, the charge is directed downwardly and toward an exhaust port 54 that is formed between the main scavenge ports 52. The exhaust port 54 delivers exhaust gases, in a manner which will be described shortly, to an exhaust passage 55 formed in the cylinder block 32. The exhaust passage 55 communicates with a suitable exhaust system for discharge of the exhaust products to the atmosphere.

The flow direction of scavenging air from the main scavenge passages 52 and main scavenge ports and toward the exhaust port 54 are depicted by the shaded lines 56 in FIG. 4. This type of scavenging action achieved by these ports is generally known as Schnurle scavenging.

In addition to the main scavenge passages 52 and their scavenge ports 53, there is also provided an auxiliary scavenging passage 57 which extends from the crankcase chamber 43 to the cylinder bore 33 and opens therein through an auxiliary scavenging port 58. This auxiliary scavenging port 58 is diametrically opposed to the exhaust port 54. The flow pattern from the auxiliary scavenge passage 57 and port 58 follows the path indicated by the arrow 59 in FIG. 4. Generally, this flow is also upwardly along the side of the cylinder bore and then turned by the cylinder head down toward the exhaust port 54. The exhaust flow exits generally in the direction shown by the arrow 61 in FIGS. 2 and 4.

As is noted in my aforenoted copending application and patent, the excellent effects of the Schnurle type scavenging raise a possibility that fuel which may be mixed with the inducted air can pass out of the exhaust port 54. Thus, in order to provide some stratification and restrict to some extent the scavenging air flow, there is provided a supplemental scavenge passage 62 that extends from the crankcase chamber upwardly between at least one of the main scavenge passages 52 and the auxiliary scavenge passage 57.

This supplemental scavenge passage 62 terminates in a generally radially extending portion 63 which, in turn, opens into the cylinder bore 33 through a supplemental scavenge port 64. This supplemental scavenge port 64 is disposed between the main scavenge port 53 and the auxiliary scavenge port 58 at one side of the combustion chamber.

The flow from this supplemental scavenging system and the supplemental scavenge port 64 generally flows diametrically across the cylinder bore 33 to strike the opposite side of the cylinder bore wall. The flow then passes axially upwardly along the cylinder bore surface where it strikes the cylinder head 35 to be redirected downwardly back toward the supplemental scavenge port 64.

This flow pattern is indicated by the arrow 65 in the figures. This actually creates what can be considered to be a tumbling motion within the cylinder bore and which, in effect, forms an isolated area on the side opposite the exhaust port 54 and which assists in ensuring that the air and fuel charged will not pass out the exhaust port 54.

To take advantage of this scavenging stratification effect, fuel is delivered into the combustion chamber 36 so that it will pass primarily through the supplemental scavenging system. In order to achieve this result, a fuel injector, indicated generally by the reference numeral 66, is mounted in the cylinder block 32. The fuel injector 66 may be of any known type such as one that employs a solenoid-operated valve for controlling the fuel injection timing and amount.

Fuel is supplied to the fuel injector 66 through a suitable fuel supply system which includes a pressure-regulating arrangement wherein the pressure of the fuel is controlled. A typical type of fuel supply system will be described later by reference to the embodiment of FIGS. 20–23. However, those skilled in the art will readily understand how the invention may be employed with a wide variety types of fuel injectors and fuel supply systems.

Figure 2:
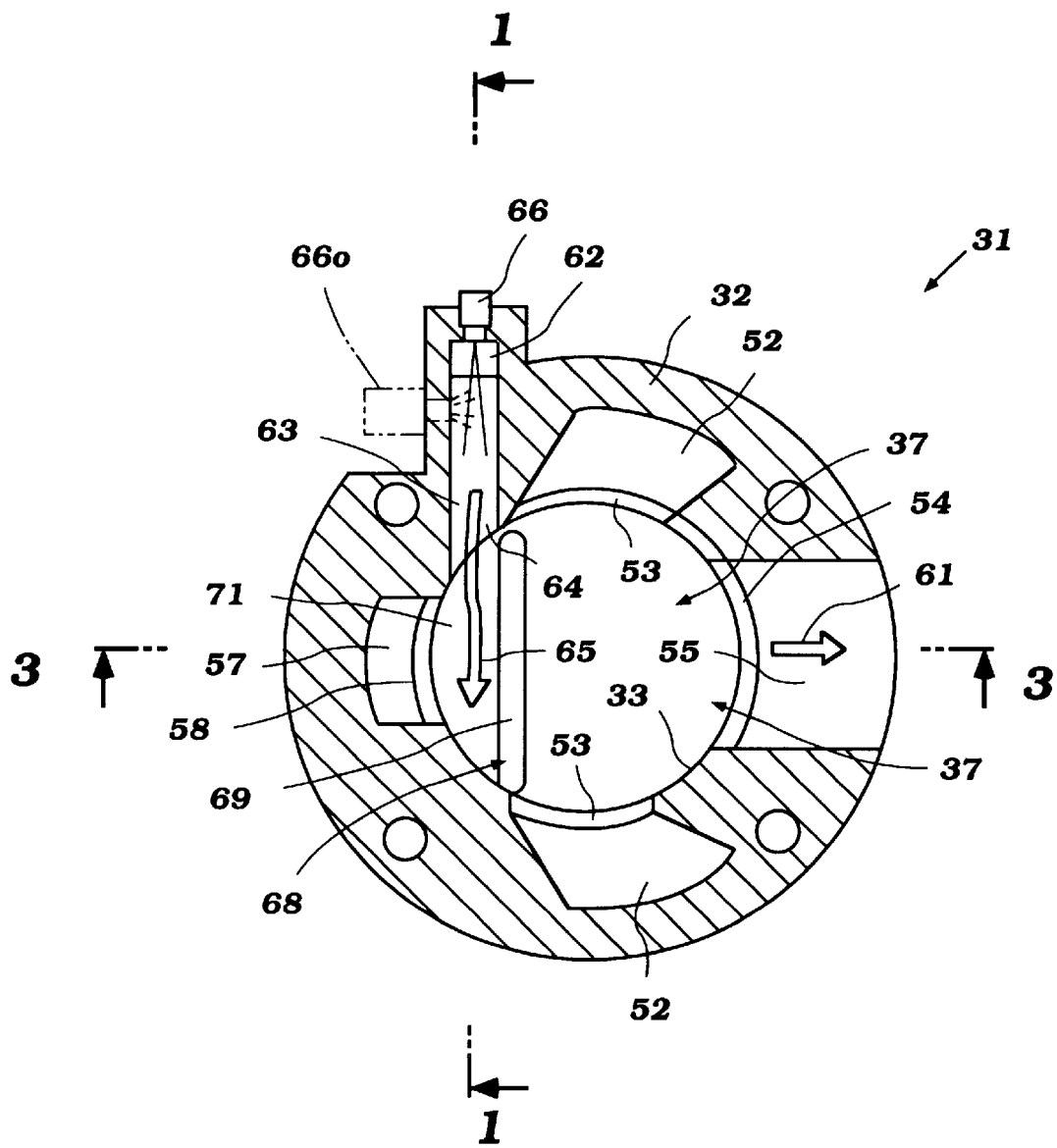
FIG. 2 is an enlarged cross-sectional view, taken along the line 2—2 of FIG. 1 and is taken also perpendicularly to the cylinder bore axis and through the ports of the engine.

As may be seen in the figures and particularly FIGS. 1 and 2, the injector 66 is disposed so that its spray axis is substantially aligned with the supplemental passage 63 and the supplemental port 64. Hence, the fuel sprayed by the injector 66 will flow generally diametrically across the cylinder bore and be entrained with the air flow so as to improve the stratification effect.

Although the fuel injector location described is a particularly advantageous one, other locations for injecting the fuel into the system are possible. Fuel may be injected, for example, into the throttle body 45 as shown by the alternate injector location 66a in FIG. 1. Also, fuel may be injected into the crankcase chamber as shown by the alternate location 66b in this Figure. Although these embodiments have some utility, it is desirable to have a large portion of the fuel injected delivered through the supplemental scavenge system comprised of the passages 62, 63 and 64 to maximize the effect of stratification. These alternative locations may be utilized to supply additional fuel required for high-speed high-load operation in conjunction with the location already described.

Also, the injector 66 may be mounted so as to spray not parallel to the supplemental passage portion 63 but slightly transversely to it and at the port 64 as shown by the alternative location 66c in FIG. 1. This location will direct the fuel downwardly. With this location, the fuel will be injected into the air flow path 65 so as to assist in mixing and also to have stratification of the mixed charge.

Further alternative locations may be in the cylinder bore 66 at the location 66d, still in the path of air flow 65. Alternatively, the injector 66 may be mounted in the cylinder head 36 at the location 66e which is still in the flow path 65.

Finally, the injector need not spray axially of the passage portion 63 but may spray transversely into it as shown at 66o in FIG. 2. Because of the relatively high air flow velocity, the fuel will mix well with and be vaporized by the air flow.

A spark plug 67 is mounted in the cylinder head 35 in an offset location so as to also be in the path of the flow 65 so as to ensure that there will be a stoichiometric mixture present at the gap of the spark plug 67 at the time when it is fired.

Figure 5:
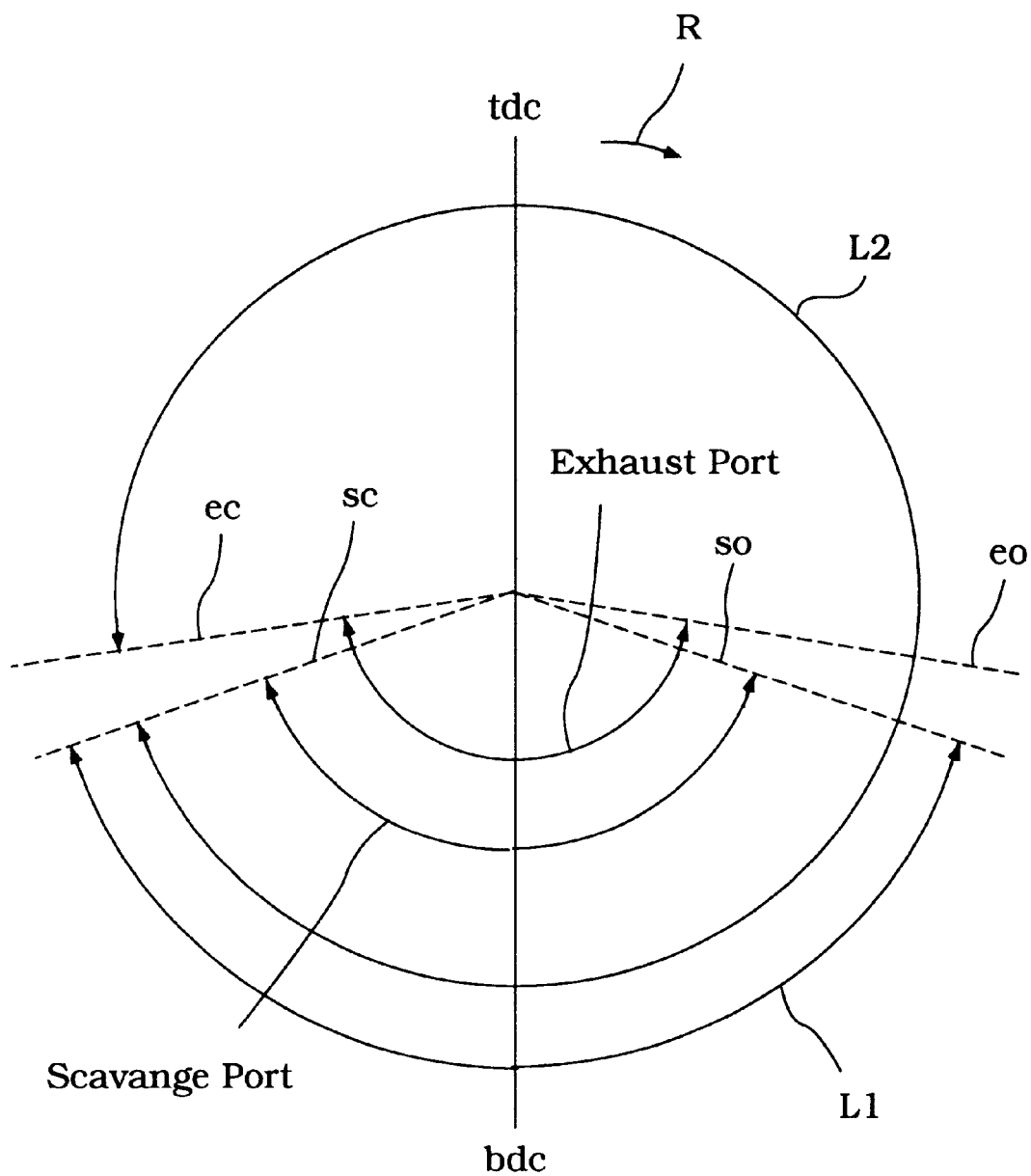
FIG. 5 is a timing diagram showing the timing of port opening and closing and explaining the timing for fuel injection.

Referring to FIG. 5, this is a timing diagram wherein the direction of rotation of the crankshaft 42 is indicated by the arrow R. The exhaust port 54 opens at the timing eo and, as is typical with two-cycle practice, before the opening of the timing of the scavenge ports 53, 58 and 64. In this embodiment, all scavenge ports including the supplemental port open at the same crank angle, indicated by the line so. The scavenge ports 53, 58 and 64 all close first at the crank angle sc with the exhaust port closing later at the angle ec.

Basically, fuel may be injected at any time when the crankshaft is rotating. However, when fuel is injected through the scavenge port, it is desirable to inject the fuel in the time period indicated at i1. This is the time when the supplemental scavenge port 64, through which the fuel is injected, is open. However, when the injection takes place directly through the scavenge passage 63, it can also be initiated at a time before the scavenge port opens and actually anywhere indicated by the arc i2.

Preferably, however, the injection of fuel is terminated regardless of where it is injected so long as the injection is completed before the exhaust port 54 closes. This will tend to ensure that fuel will not pass out of the exhaust port 54.

The construction as thus far described may be considered to be substantially the same as mentioned in my co-pending application filed concurrently herewith.

In accordance with the features of this invention, the piston 37 is formed with a dividing wall, indicated generally by the reference numeral 68. In this embodiment, the dividing wall 68 is formed as an upstanding wall portion 69 that extends transversally across the piston and in a position, as best seen in FIGS. 2 and 3, from a point that lies circumferentially between the main scavenge port 53 and the supplemental scavenge port 64.

Figure 3:
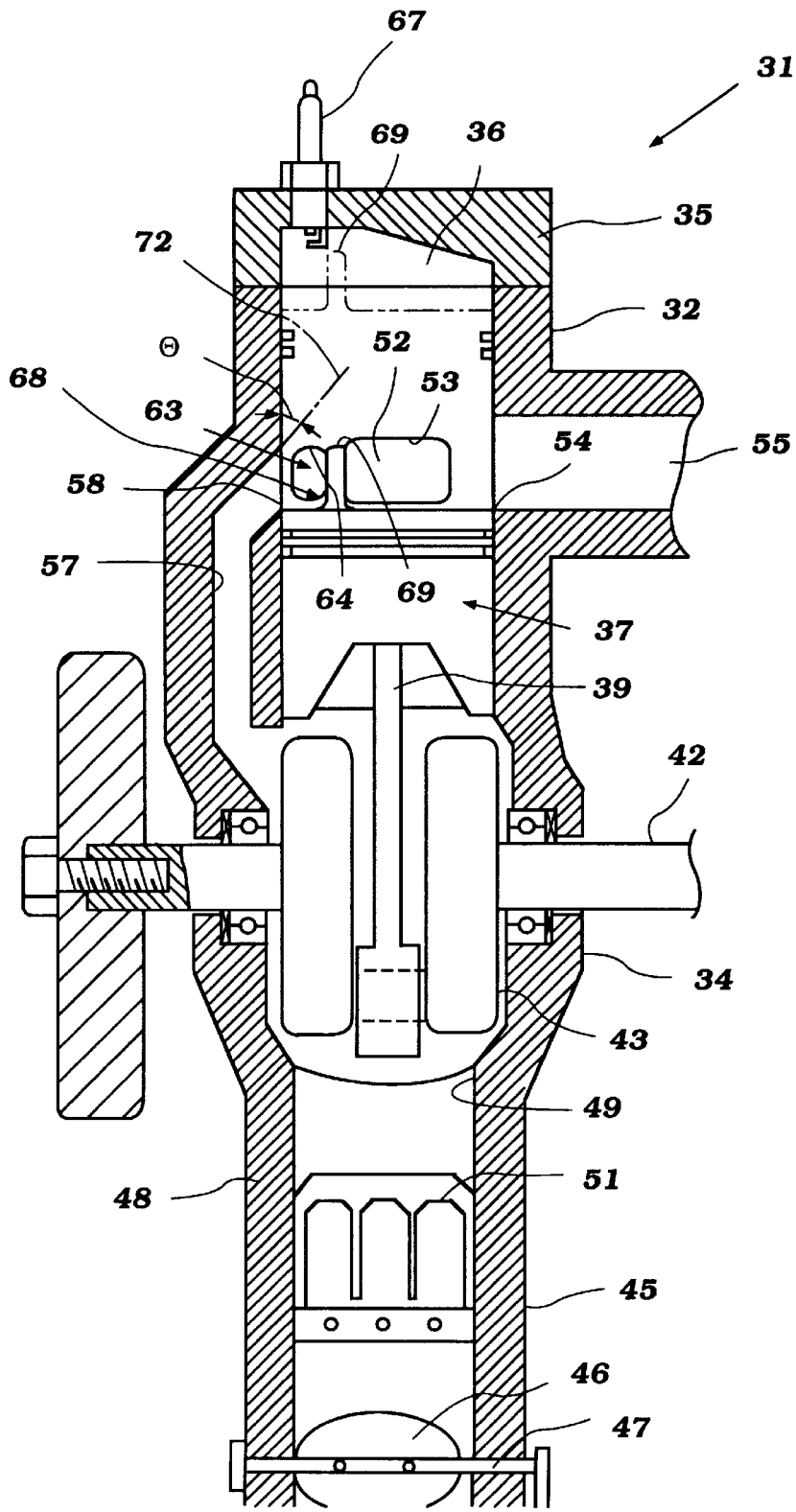
FIG. 3 is a cross-sectional view, taken along the line 3—3 of FIG. 2.

Thus, when the piston at the bottom dead center condition, as shown in FIG. 3, there will be defined a first area 71 that is disposed in registry with the supplemental scavenge port 63 and which is separated by the upstanding wall portion 69 from the flow through both of the main scavenge ports 53. Thus, even though the ports 53 and 64 are closely adjacent each other, the wall 69 will form a separating body so that there will be no mixing of the flow when it issues from the supplemental port 64.

In addition, this wall 69 has the effect of deflecting the flow from the auxiliary scavenge port 58 in an upward direction generally along its upper edge 72 which is disposed at a relatively shallow angle θ to the cylinder bore as also shown in FIG. 3. Hence, the flow will tend to be in an upward direction and maintain the stratification of the fuel and to prevent the direct flow toward the exhaust port 54.

Next will be described a series of embodiments that have the same scavenging system as already described. These embodiments differ from the previously described embodiment only in the configuration of the dividing wall on the piston 37 between the main scavenge ports 53 and the supplemental scavenge port 64. For that reason, components which are the same or substantially the same as those previously described have been identified by the same reference numerals. These components will be described again only insofar as is necessary to understand the construction and operation of these additional embodiments.

Figure 6:
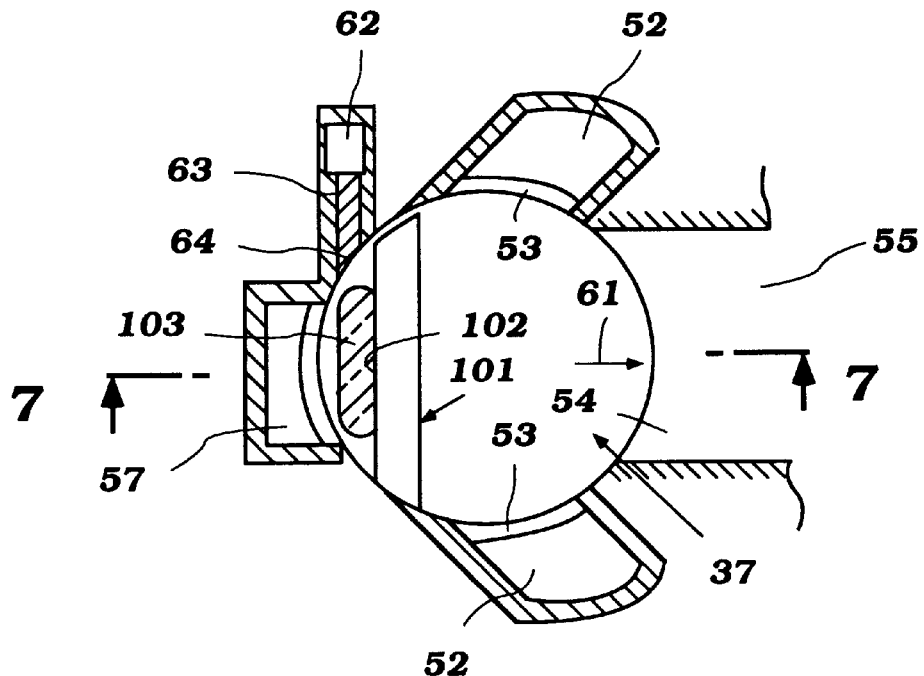
FIG. 6 is a partial cross-sectional view, in part similar to FIG. 2, and shows another embodiment of the invention.
Figure 7:
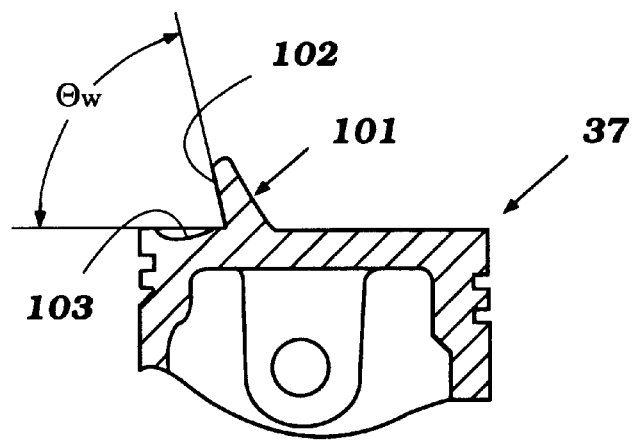
FIG. 7 is a cross-sectional view, taken along the line 7—7 of FIG. 6.

Because of the difference only in the shape of the dividing wall already noted, a lesser number of views is believed to be necessary to permit those skilled in the art to understand these other embodiments, the first of which appears in FIGS. 6 and 7.

In this embodiment, the piston 37 is formed with an upstanding wall 101 which is generally inclined from the vertical so as to define an edge portion 102. This edge portion 102 is disposed at an angle θw to the horizontal and one that is less than a right angle. This causes deflection of the fuel toward the auxiliary scavenge port 58 but more importantly toward a fuel collecting well 103 formed on the side of the piston head adjacent the wall portion 102. Thus, fuel can puddle in this well 103 and will eventually evaporate due to the high heat and at the time when the piston is approaching top dead center position and the spark plug 67 so as to ensure the presence of a stoichiometric mixture even when running under low speeds and low loads.

Figure 8:
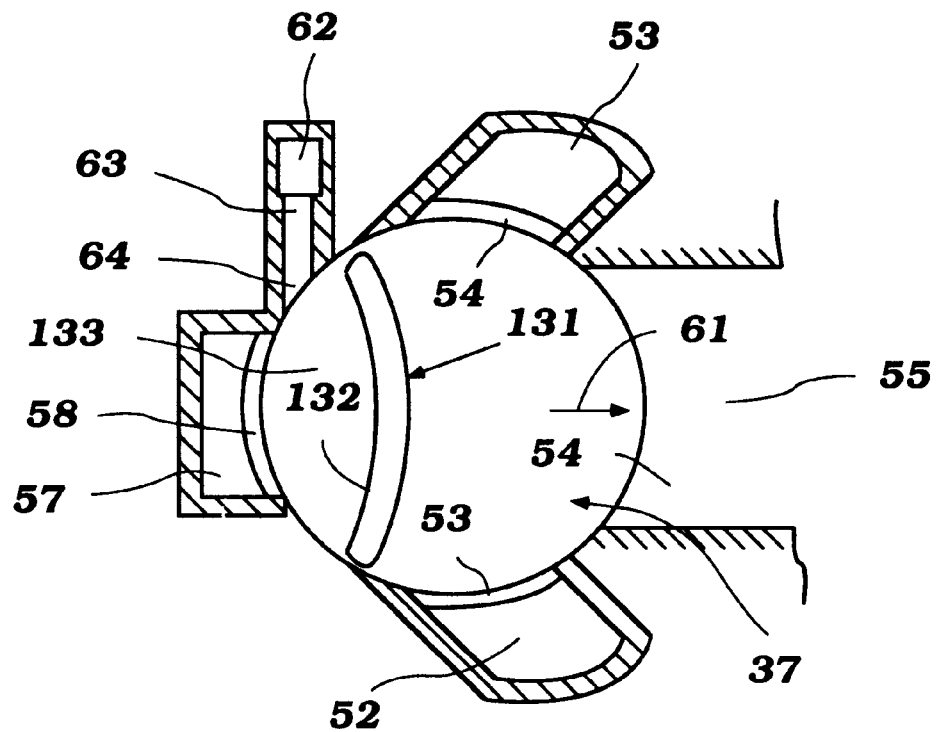
FIG. 8 is a partial cross-sectional view, in part similar to FIGS. 2 and 6, and shows yet another embodiment of the invention.
Figure 9:
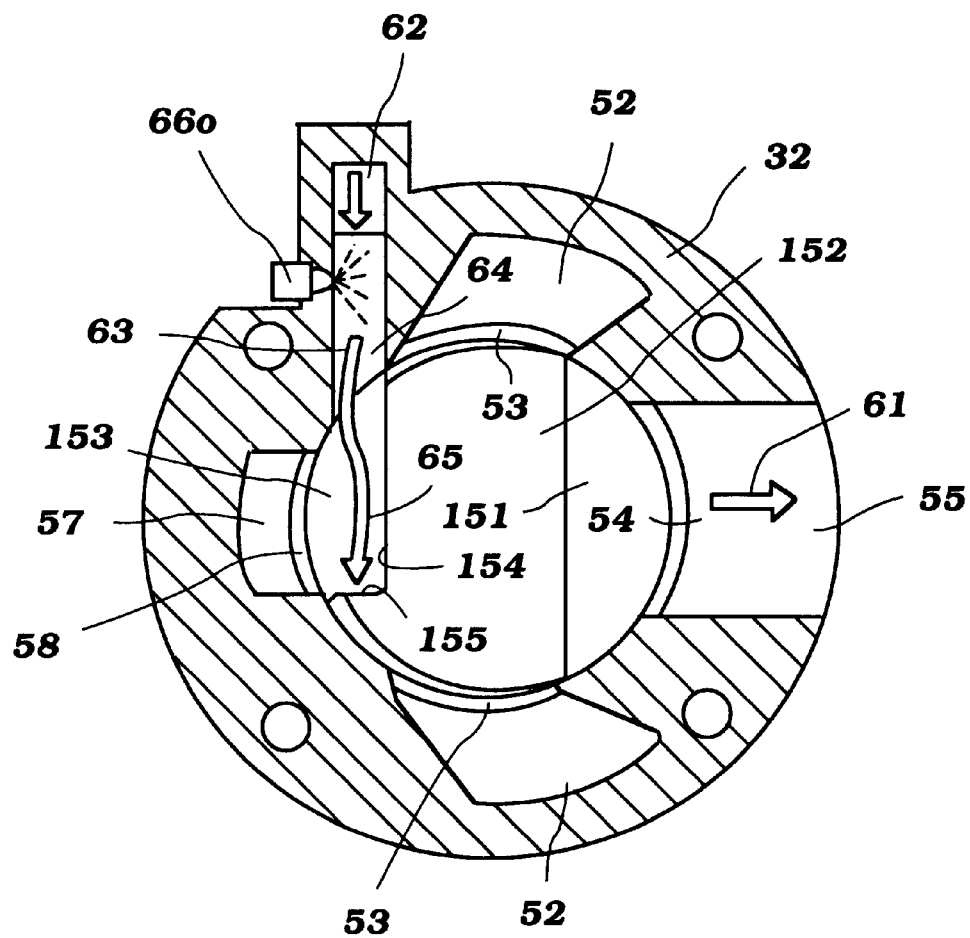
FIG. 9 is a cross-sectional view, in part similar to FIGS. 2 and 6–8, and shows yet another embodiment of the invention.
Figure 10:
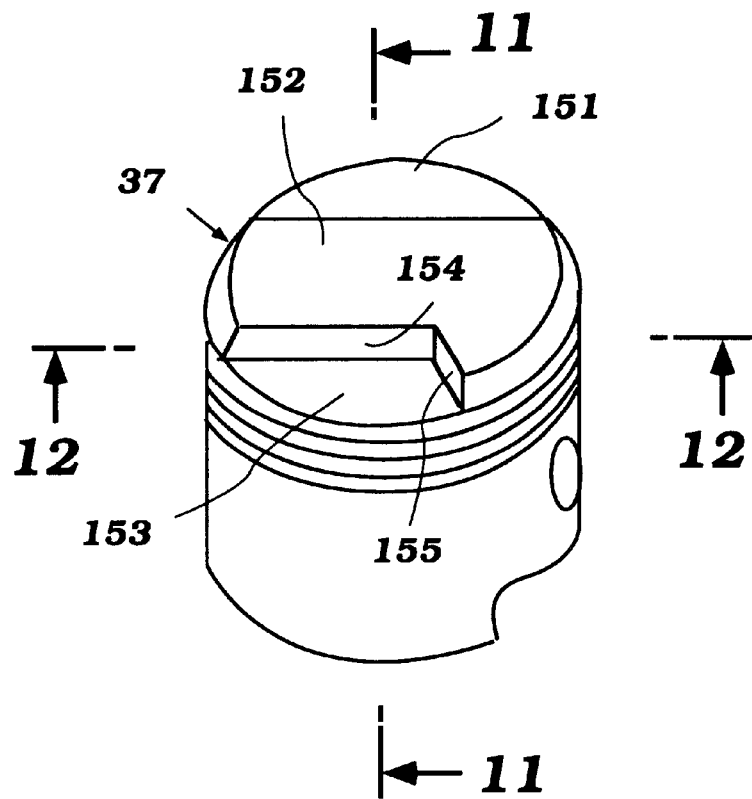
FIG. 10 is an enlarged perspective view of the piston utilized in the embodiment of FIG. 9.
Figure 11:
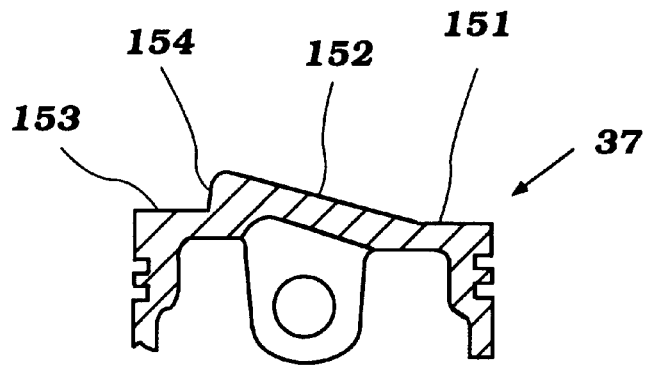
FIG. 11 is a cross-sectional view taken along the line 11—11 of FIG. 10.
Figure 12:
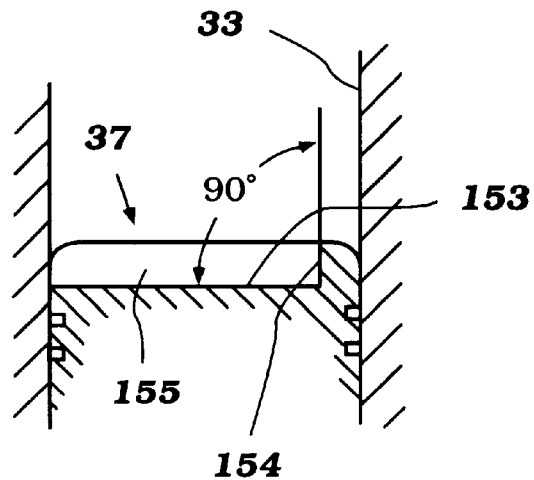
FIG. 12 is a cross-sectional view taken along the line 12—12 of FIG. 10 and also shows the piston in the cylinder bore.

FIG. 8 shows yet another embodiment. In this embodiment, the piston 37 is formed with an upstanding arcuate wall 131 which has a generally concave surface 132 to define an area 133 that has a somewhat larger volume that the previously described embodiments. The curvature of the wall portion 132 will tend to further assist in maintaining the air flow toward the side of the cylinder bore 33 opposite to the exhaust port 54.

FIGS. 9–12 show another embodiment of the invention wherein the piston 37 has a dividing wall of different configuration. In this embodiment, the piston 37 has a head portion which defines a generally flat surface 151 that is disposed on the side adjacent the exhaust port 54. A generally planar, angularly inclined, upstanding portion 152 is formed which extends from a point beginning about at the edges of the main scavenge ports 53 adjacent the exhaust port 54 and continues across the remainder of the piston head.

However, a part of the portion 152 adjacent the supplemental scavenge port 63 and extending beyond the auxiliary main scavenge port 58 is provided with a cutout area, to define a surface indicated at 153. This cutout area is defined by a first generally diametrically extending wall 154 that extends from the circumferential edge of the supplemental scavenge port 64 adjacent the edge of the main scavenge port 53.

This wall 154 extends in generally parallel relationship across the diameter and terminates in a further wall 155 which extend generally at right angles to the wall 154 and lies in alignment with the furthest spaced circumferential edge of the auxiliary scavenge port 58. Thus, the area defined by the walls 154 and 155 and the surface 153 entrap the charge that is issuing and maintain the stratification as aforedescribed.

This particular embodiment also lends itself to utilization of the side-mounted injector at the location 66f since the flow of air is transverse to the injection spray. Thus greater fuel dispersion is possible.

Figure 13:
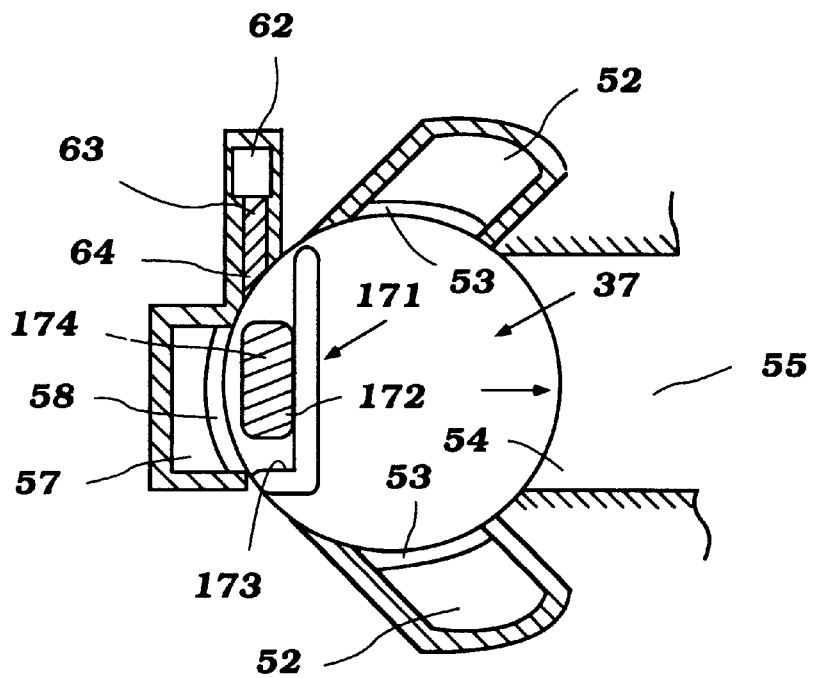
FIG. 13 is a partial cross-sectional view, in part similar to FIGS. 2, 6, 8 and 9, and shows a still further embodiment of the invention.

FIG. 13 shows another embodiment of the invention which provides a barrier or wall area similar to the embodiment of FIGS. 9–12. However, in this embodiment, the barrier wall is formed by an upstanding L shaped wall 171 that is comprised of a first portion 172 that extends generally diametrically across the piston head and which is intersected at its other end by a perpendicular wall 173. In this embodiment, the area defined between the walls 172 and 173 may be also formed with a small well 174 to further entrap or collect and retain the fuel for evaporation. This is similar to the embodiment of FIGS. 6 and 7 in this regard.

Figure 14:
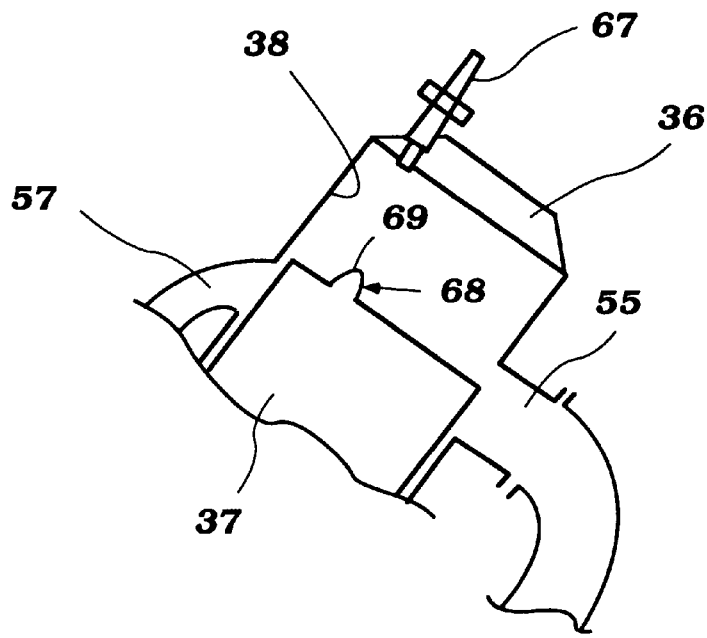
FIG. 14 is a cross-sectional view showing how the embodiment can be utilized with inclined engines.

In all of the embodiments thus far described, the engine 31 has been depicted in such a manner that it appears that the cylinder bore extends in a vertical direction. It should be understood, however, that such an orientations is not necessary in order to have the invention serve its intended purpose. Therefore, and only by way of example, FIG. 14 is a schematic view showing how the engine 31 could be mounted in an application, such as a motorcycle, where the cylinder bore axis does not extend vertically. In FIG. 14, the components of the engine are identified by the same reference numerals as utilized in the embodiment of FIGS. 1–5, but it is to be understood that any of the previously described embodiments can be utilized in such an orientation.

Also, and, as will be described in conjunction with the embodiments of FIGS. 20–23, it is possible to use the invention in conjunction with engines when the cylinder bore axis extends horizontally. This could be an either the case of opposed engines or engines mounted with their crankshafts 42 rotating about vertically extending axes.

Figure 15:
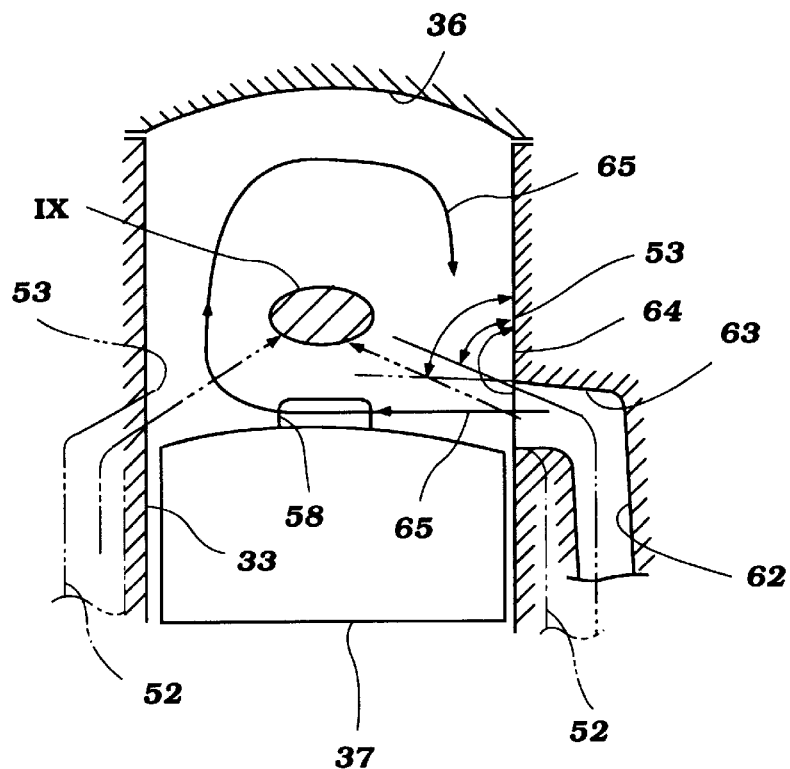
FIG. 15 is a cross-sectional view showing how the flows through the various ports in the described embodiments assist in maintaining stratification of the fuel charge.

FIG. 15 is a view that is similar to the view of FIG. 1 in that it is taken along the same plane, i.e., the line 1—1 of FIG. 2. However, the main scavenge passages 52 and their scavenge ports 53 are shown in this Figure in order to further explain how the stratification effect is obtained. It will be seen that the main scavenge ports 52 and their discharge ends 53 are configured so as to direct the flow of the air charged in a generally upward direction. The fuel patch indicated at Ix that is injected by the injector 66 through the supplemental passage portion 63 and out of the port 64 will tend to be driven upwardly and dissipated by this air flow.

However, the provision of the separating wall 68 tends to avoid this action and keeps the fuel patch more in the flow path 65 from the supplemental scavenge port 64. In addition, this wall and the flow path will tend to break up some of the scavenging air flowing out of the main scavenge ports 58 and separated from this wall of the cylinder to help in maintaining the stratification.

Figure 16:
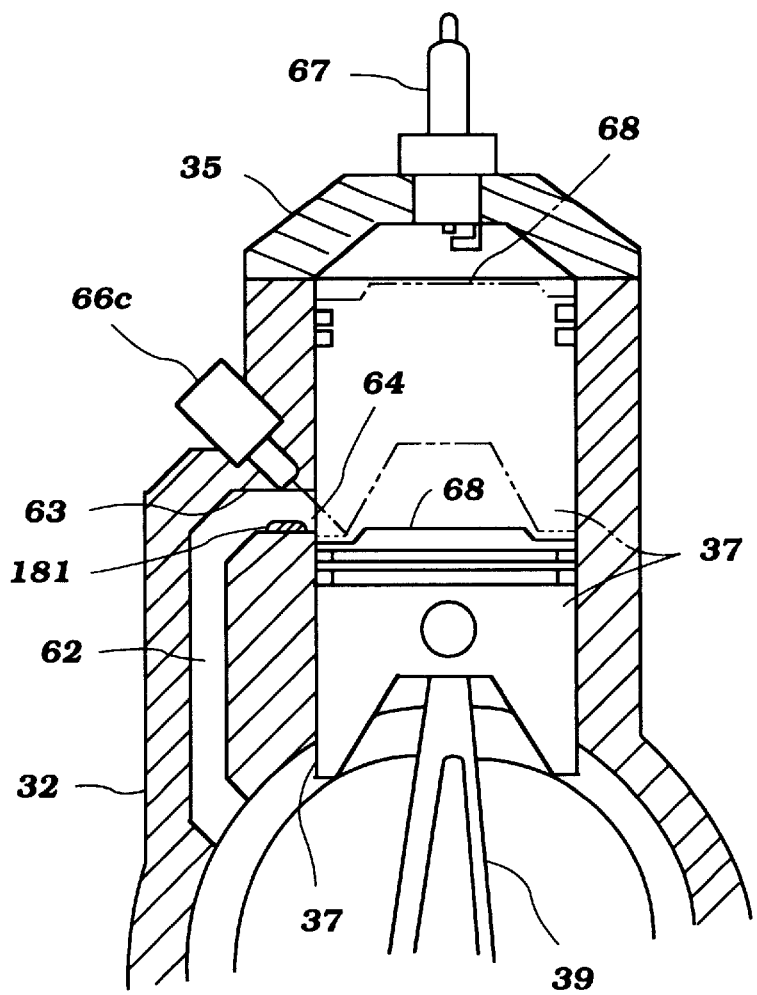
FIG. 16 is a cross-sectional view, in part similar to FIG. 1 and shows yet another embodiment of the invention.

It has been previously noted that the fuel injector 66 may be placed in a location where it sprays not co-axially with the supplemental scavenge passage portion 63 but rather at a location as shown at 66c in FIG. 1. FIG. 16 is a view which helps explain how the fuel is handled and stratified with such an arrangement.

It should be noted that the fuel spray is in such a direction that some fuel will deposit on the lower wall of the passage portion 63, this being shown at 181. However, the air flow will cause this fuel to be swept onto the head of the piston 37 and retained in the area on the side of the wall 68. Thus, this fuel will be conveyed upwardly toward the spark plug 67 on the head of the piston 37 as it continues to move toward top dead center.

Because of the combustion heat which is residual in the piston 37, the fuel will rapidly evaporate but still be retained by the wall 68 in the area where it will be free of the scavenging flow so as to ensure the presence of a stoichiometric mixture at the spark gap at the time of firing of the spark plug 67.

Figure 17:
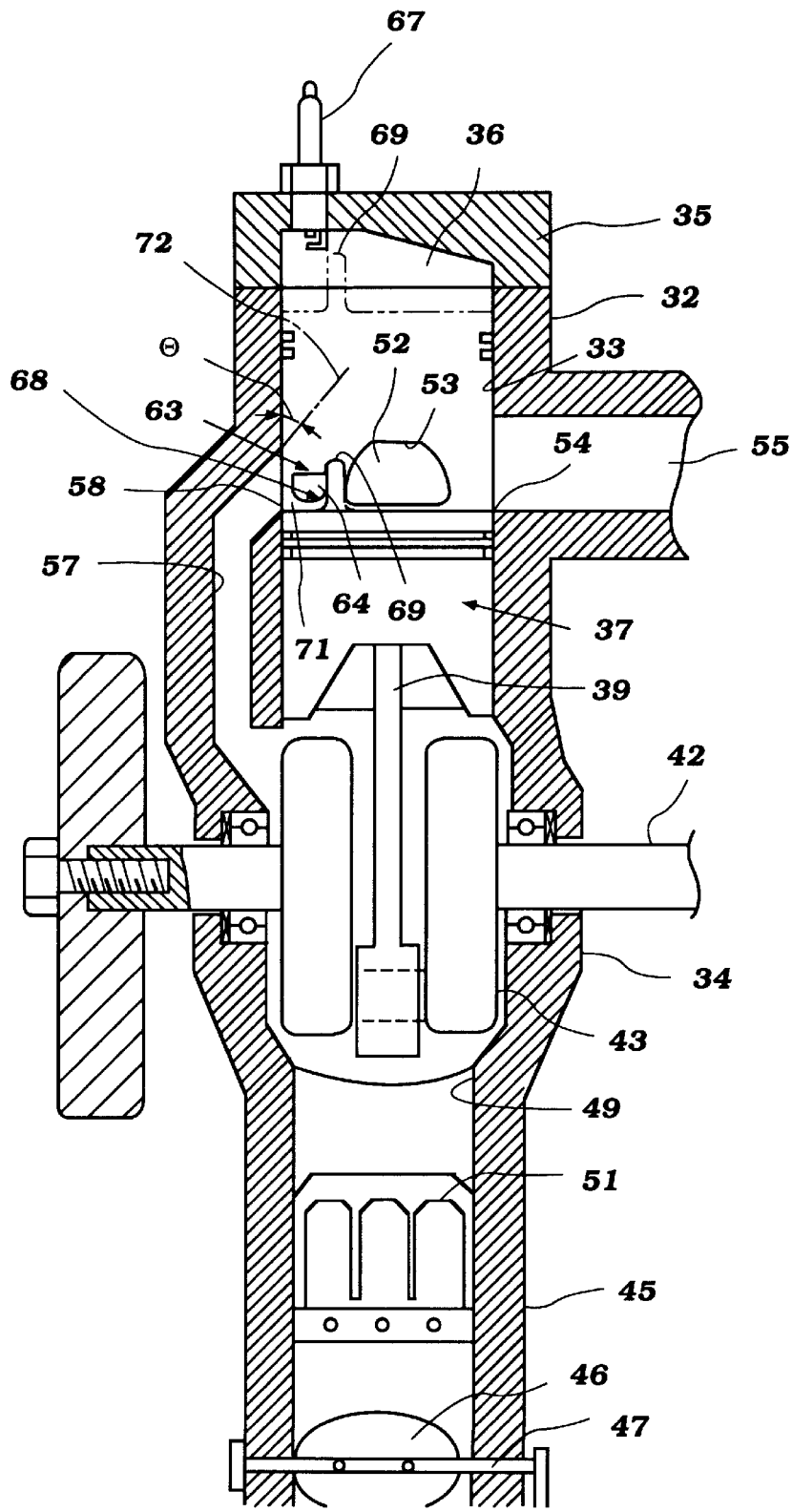
FIG. 17 is a cross-sectional view, in part similar to FIG. 3, but shows how the port timing can be varied in accordance with another feature of the invention.
Figure 18:
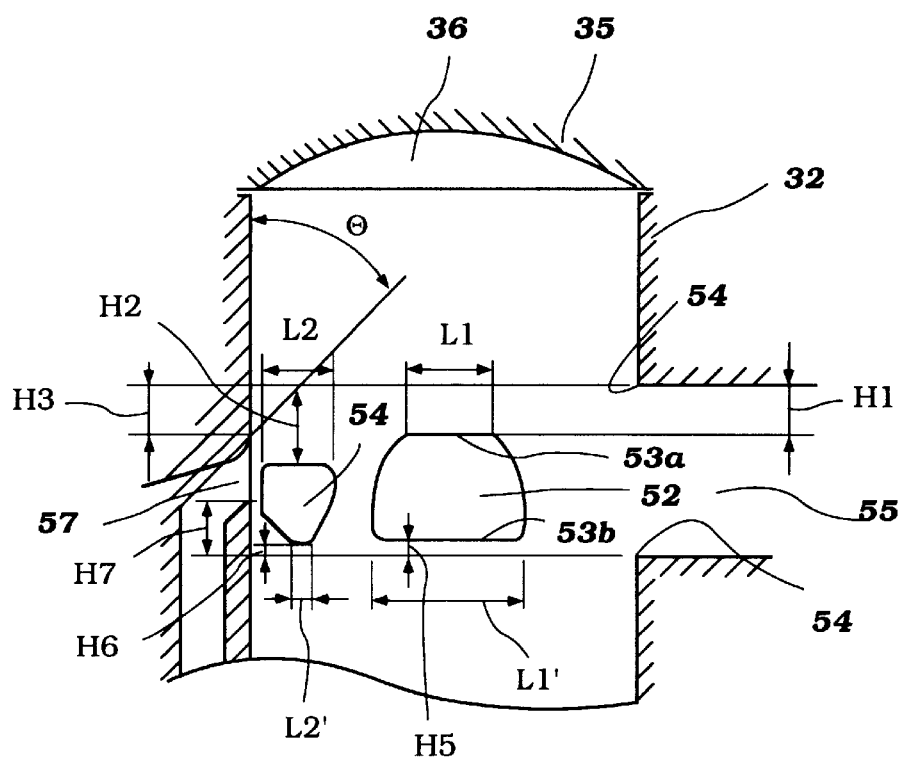
FIG. 18 is a developed view of the cylinder showing the relationship of the port configurations.
Figure 19:
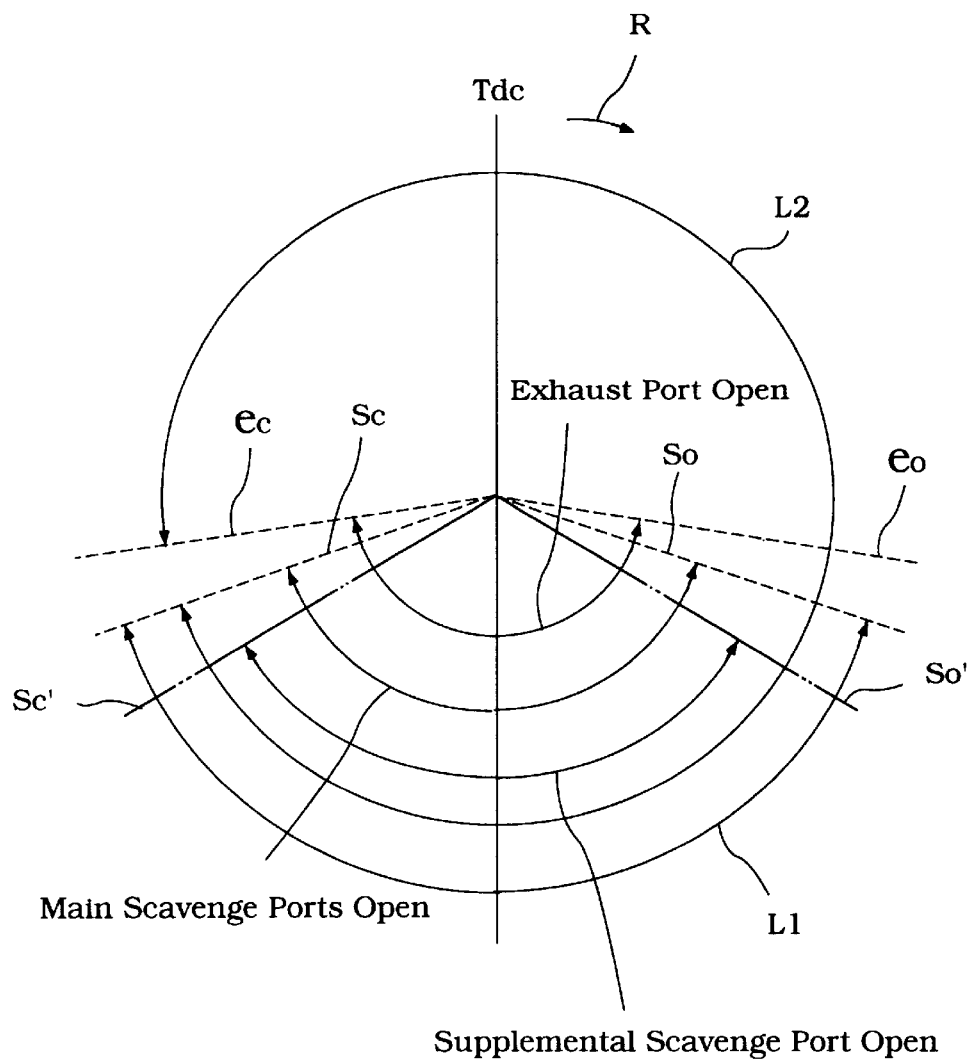
FIG. 19 is a timing diagram showing the port timing in connection with this embodiment.

FIGS. 17–19 show another embodiment of the invention which is generally similar to the embodiment of FIGS. 1–5. For that reason, components of this embodiment which are the same as that embodiment have been identified by the same reference numerals and will be described again only insofar as is necessary to understand the construction and operation of this embodiment.

Also, although this embodiment uses a wall of the type shown in FIGS. 1–5, it is also to be understood that the concept that will be described in connection with this embodiment can be utilized with any of the wall or separating devices previously described.

The main feature of this embodiment is that there is a difference in the timing of opening of the scavenge ports. In the previously described embodiments, all scavenge ports 53, 58 and 64 opened at the same time. In this embodiment, however, the main scavenge ports 53 and the auxiliary scavenge port 58 are staggered relative to each other. Thus the main scavenge ports 53 open slightly before the auxiliary scavenge port 58. All of these scavenge ports 53 and 58 are configured so that they will open at a slightly earlier time than the supplemental scavenge port 64, as seen primarily in FIG. 19.

Also as with the previous embodiments, the height of the wall 68 is such that it will be across the front of the supplemental scavenge port 58 at the time it is opened so that substantially all of the flow from it will be confined, at least initially, by the wall 68.

Furthermore, the scavenge ports are configured so that the supplemental scavenge port 64 has a relatively wider upper portion than its lower portion as indicated by the dimensions L2 and L2' as best seen in FIG. 18.

Thus, upon initial opening of the auxiliary scavenge port 64, there will be a greater flow area to make up in part for its late opening. Also, on closing there will be a smaller initial restriction for the same reason. In other words, a shorter flow duration is provided with the larger flow area so that the flow volume can still be relatively large.

With the main scavenge ports 53, on the other hand, they open earlier than the supplemental scavenge port 64. This is because the distance H1 (FIG. 19) between their upper edge and the opening of the exhaust port is less than the distance H2 between the upper edge of the exhaust port 69 and the upper edge of the supplemental scavenge port 82.

The auxiliary scavenge port 57 opens slightly later than the main scavenge ports but before the supplemental scavenge port 64 since its upper edge is at the distance H3 from the edge of the exhaust port and H1>H3>H2.

On closure of the various scavenge ports, it should be noted that the main scavenge ports 54 and supplemental scavenge port 64 begin to close shortly after the beginning of closing of the exhaust port 54. The lower edges of these ports 53 and 64 are at the distances H5 and H6 from the lower edge of the exhaust port. These ports 53 and 64 will begin to close at the same time since H5 equals H6. However, the auxiliary scavenge port 57 begins to close at a later time since its distance H7 from the exhaust port edge is greater.

$$H7>H5=H6$$

However, the closing times will be as aforenoted.

Also, the upper edge width L1 of the main scavenge ports 53 is less than the lower edge width L1'. Hence, a more restricted flow will occur initially and at the end. Thus, more air will be drawn into the supplemental port 82 initially and this flow will continue longer. This aids in stratifying the fuel mixture. In all other regards, this embodiment is constructed and operates the same as the previously described embodiments.

In this embodiment, the timing for the fuel injection will be described by particular reference to FIG. 19. This is a timing diagram that is similar to the timing diagram of FIG. 5. As noted, the auxiliary scavenge port opens later so' and becomes fully closed earlier sc' than the main and auxiliary scavenge ports (so and sc, respectively). It should be noted that the auxiliary scavenge port timing is slightly different from that of the main scavenge port, but this is not particularly significant insofar as the fuel injection occurs.

As previously noted, fuel may be injected any time during the cycle, but preferably not during the time after the main scavenge ports have closed and the exhaust port is still open. This time period is indicated at i2 as previously described. With this embodiment, fuel can be injected any time when the main scavenge ports are open indicated at i1. However, it should be noted that in the instances where fuel is injected into the supplementary scavenge passage 62, then fuel that is injected after its port 64 has closed will remain and will be discharged during the next opening of this port. In this way, it can be ensured that adequate fuel can be supplied for all running conditions.

The previously illustrated embodiments have shown single cylinder engines and those having vertical or inclined cylinder bores. It has been noted however that the invention can be used with multiple cylinder engines and those having different orientation. Also the possibility of varying applications has been discussed.

Reference has also been made to the fuel supply system for the fuel injector 66 and the control strategy. These details and a specific multi-cylinder application and other orientation of the engine will now be described by reference to FIGS. 20–22 which show another embodiment of the invention.

This embodiment differs from those previously described in showing a specific type of propulsion application for the engine. In addition, this embodiment illustrates how the invention can be employed with an engine having V-type or opposed type cylinder banks and in engines with more than one cylinder in each bank. With such multi-cylinder engines, the circumferential location of the various ports is rotated about the cylinder bore axis to permit closer bore spacing as described in my aforementioned, co-pending application.

Reference nay be had to that application for the details of this feature. Also the invention herein can be utilized with conventional type multi-cylinder engines.

In many regards, the layout of the scavenging system, its relationship to the exhaust system for each cylinder and the various types of piston dividing walls may be as those previously disclosed. Where that is the case, those components will be identified by the same reference numerals and will be described again only insofar as necessary to understand the construction and operation of this embodiment. Also, in this embodiment, the individual components associated with each cylinder have the same construction as previously described and thus, have been identified by the same reference numerals.

Figure 20:
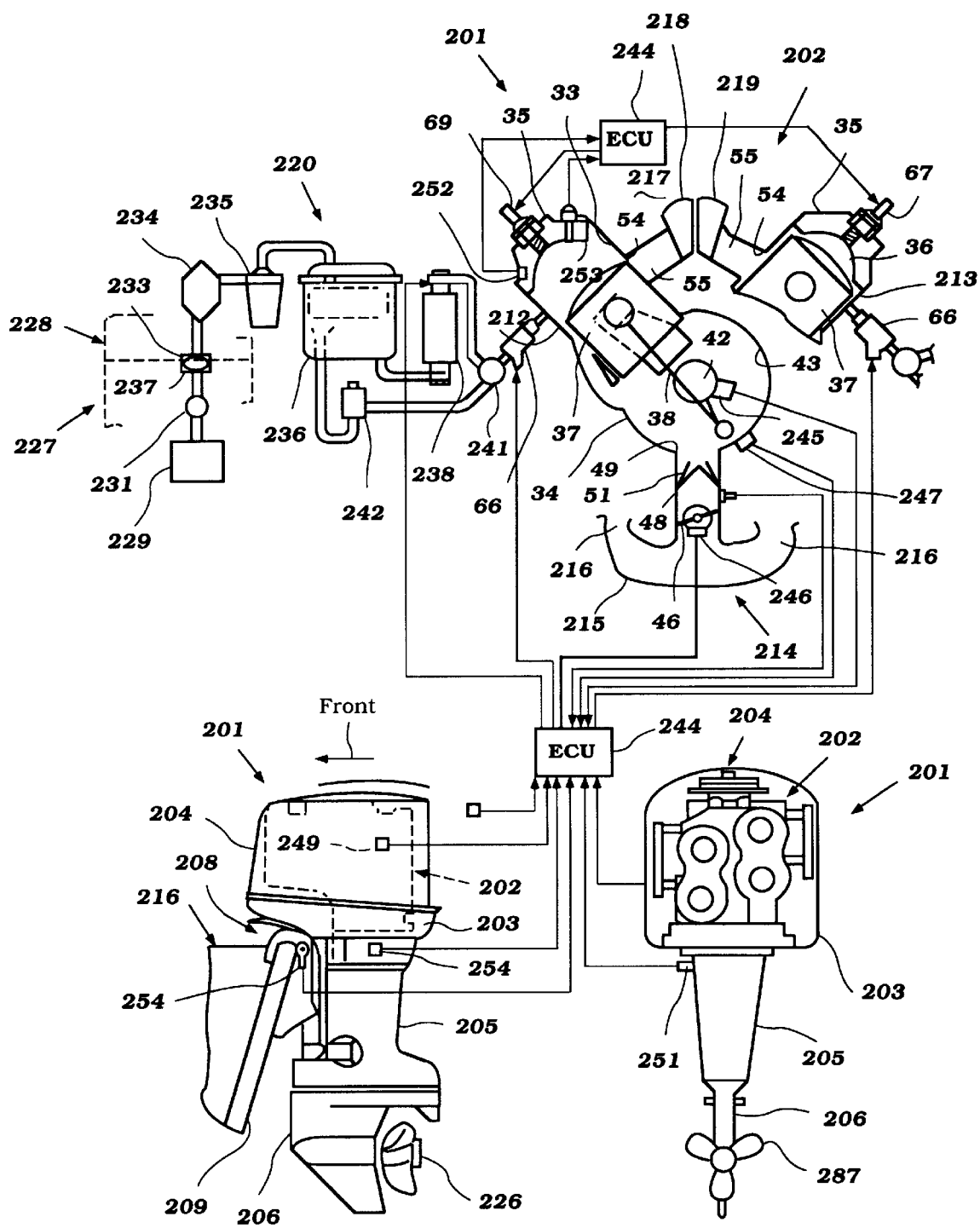
FIG. 20 is a three part view of an outboard motor constructed in accordance with another embodiment of the invention with the top view showing the engine of the outboard motor in schematic cross-section along with its associated fuel supply system. The lower left hand view shows the outboard motor attached to the transom of a watercraft, shown partially. The final view of this figure, shows the rear end of the outboard motor with a portion of the protective cowling broken away so as to more clearly show the engine construction and layout. In addition, the controller (ECU) for the engine control system links these three views together.

Referring now to these figures and initially to FIG. 20, an outboard motor constructed in accordance with this embodiment of the invention is identified generally by the reference numeral 201. The outboard motor 201 includes a V4-type two cycle crankcase compression engine, indicated generally by the reference numeral 202 and which is constructed and operated in accordance with the invention.

The outboard motor 201 is provided with a power head assembly in which the engine 202 is supported. This power head assembly includes, in addition to the engine 202, a protective cowling comprised of a lower tray portion 203 and a detachable main cowling portion 204. As is typical with outboard motor practice, the engine 202 is mounted in the power head so that the crankshaft 42 rotates about a vertically extending axis.

This crankshaft is coupled to a drive shaft (not shown) that depends into and is journalled within a drive shaft housing 205. A lower unit 206 at the lower portion of the drive shaft housing 205 includes a transmission, which may include a forward neutral reverse mechanism for driving a propeller 207 in selected forward and reverse directions.

A clamping and swivel bracket assembly, indicated generally by the reference numeral 208, is associated with the drive shaft housing 205 so as to connect the outboard motor 201 to a transom 209 of an associated watercraft which is shown partially and which is indicated generally by the reference numeral 211.

This swivel and clamping bracket assembly 208 permits tilt and trim movement of the outboard motor 201 about a horizontally disposed axis. In addition, the swivel bracket portion is connected to a steering shaft fixed to the drive shaft housing 205 to permit steering of the outboard motor 201 about a vertically extending axis. Since these constructions are may be of any conventional type and are not necessary to understand the construction and operation of the invention, reference may be had to any known structure for details that can be utilized to practice the invention.

As has been noted, the engine 202 has the same basic construction as any of the embodiments thus far described and basically may be considered to be two two-cylinder inline type engines connected together to a common crankcase 34. Thus, the cylinder block assembly is divided into first and second cylinder banks 212 and 213, each of which is formed with two cylinder bores 33 in which pistons 37 reciprocate. These pistons 37 are connected by respective connecting rods 39 to the crankshaft 42 in some instances in side-by-side fashion.

An air induction system, indicated generally by the reference numeral 214, is provided for delivering an intake air charge to the individual crankcase chambers 41 which are associated with each of the cylinder bore 33. This induction system includes an air inlet device 215 that has openings 216 that open into the interior of the protective cowling and which induct air that has been admitted through an air inlet in the outer cowling and specifically the upper cowling 204 thereof in a manner known in this art.

In this V-type embodiment, exhaust ports 54 of the cylinder bank 212 are reversed from those of the exhaust ports 54 of the cylinder bank 213 so that the exhaust ports 54 all open into a valley 217 that is formed between the cylinder bank. As is typical with outboard motor practice, the exhaust passages 55 of these two cylinder banks merge into common collector sections 218 and 219, each of which collects the exhaust gases from the respective cylinder bank 212 and 213.

Figure 21:
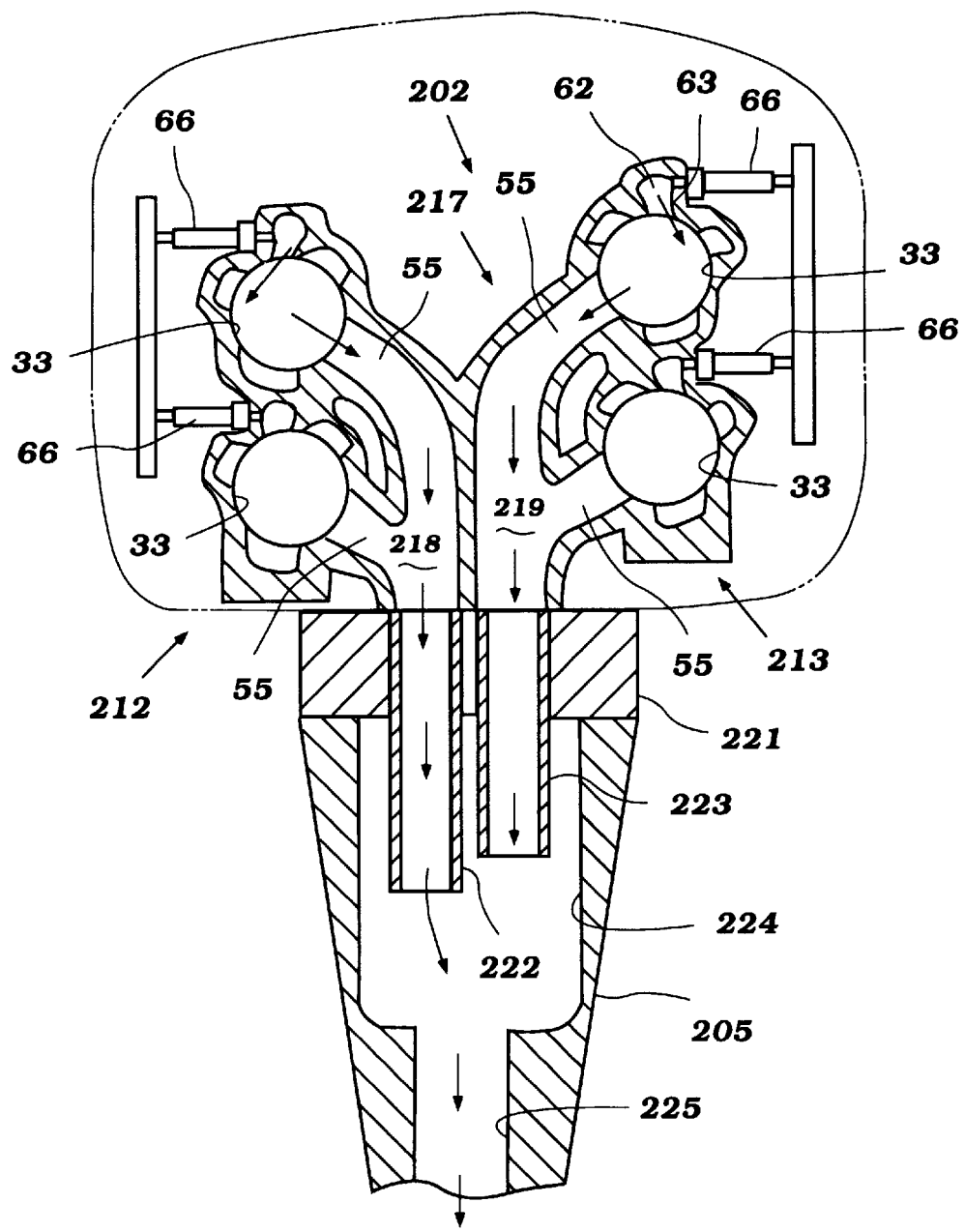
FIG. 21 is an enlarged view looking generally in the direction of the lower right-hand view of FIG. 20 but shows the engine in cross-section.

As best seen in FIG. 21, these two collector sections 218 and 219 extend in parallel downward direction toward an exhaust guide 221 positioned at the upper end of the drive shaft housing 205 and upon which the engine 202 is mounted.

A pair of exhaust pipes 222 and 223 depend from this exhaust guide 221 and the respective collector sections 218 and 219 into an expansion chamber 224 formed in the upper end of the drive shaft housing.

This expansion chamber 224 functions to silence the exhaust gases through the expansion and subsequent contraction into an exhaust passage 225 in the drive shaft housing 205 that communicates with an underwater exhaust gas discharge. In the illustrated embodiment, this is constituted through the hub exhaust gas discharge 226 shown in the lower left-hand view of FIG. 20.

In addition, above-the-water idle discharge is also provided. Since this type of exhaust system is well-known in the art, it will not be described further. It will be readily apparent to those skilled in the art how the invention can be practiced with a wide variety types of exhaust systems normally employed in marine applications.

The fuel supply system will now be described in detail and the described system may be used with any of the previously described embodiments. The described system, however, is particularly adapted for outboard motor application. This fuel supply system is indicated generally by the reference numeral 220 and includes a first portion, indicated generally as 227, that is mounted in the watercraft hull 211 and a second portion 228 that is mounted on the power head of the outboard motor 201 and specifically within the protective cowling formed by the cowling members 203 and 204.

The hull mounted side 227 includes a relatively large fuel storage tank 229 that is mounted in an appropriate location within the hull 211. A primary fuel pump 231 draws fuel from this tank 229 and delivers it to a hull side section 232 of a quick disconnect coupling. This section 232 mates with an engine-mounted side of the coupling 233. By the way, it should be noted that the structure now being described appears not only in FIG. 20 but also in the schematic view of FIG. 22.

An engine-mounted low pressure fuel pump 234 which may be mechanically driven from the engine 202 or which may be driven by the pressure pulses in the crankcase chambers 43 receives this fuel and transfers it to a fuel filter 235 where the fuel is filtered. The fuel is then delivered to a vapor separator 236 which is of a known type and in which a needle-operated valve 237 controlled by a float 238 admits fuel to the separator 236 to maintain a constant head of fuel therein.

Figure 22:
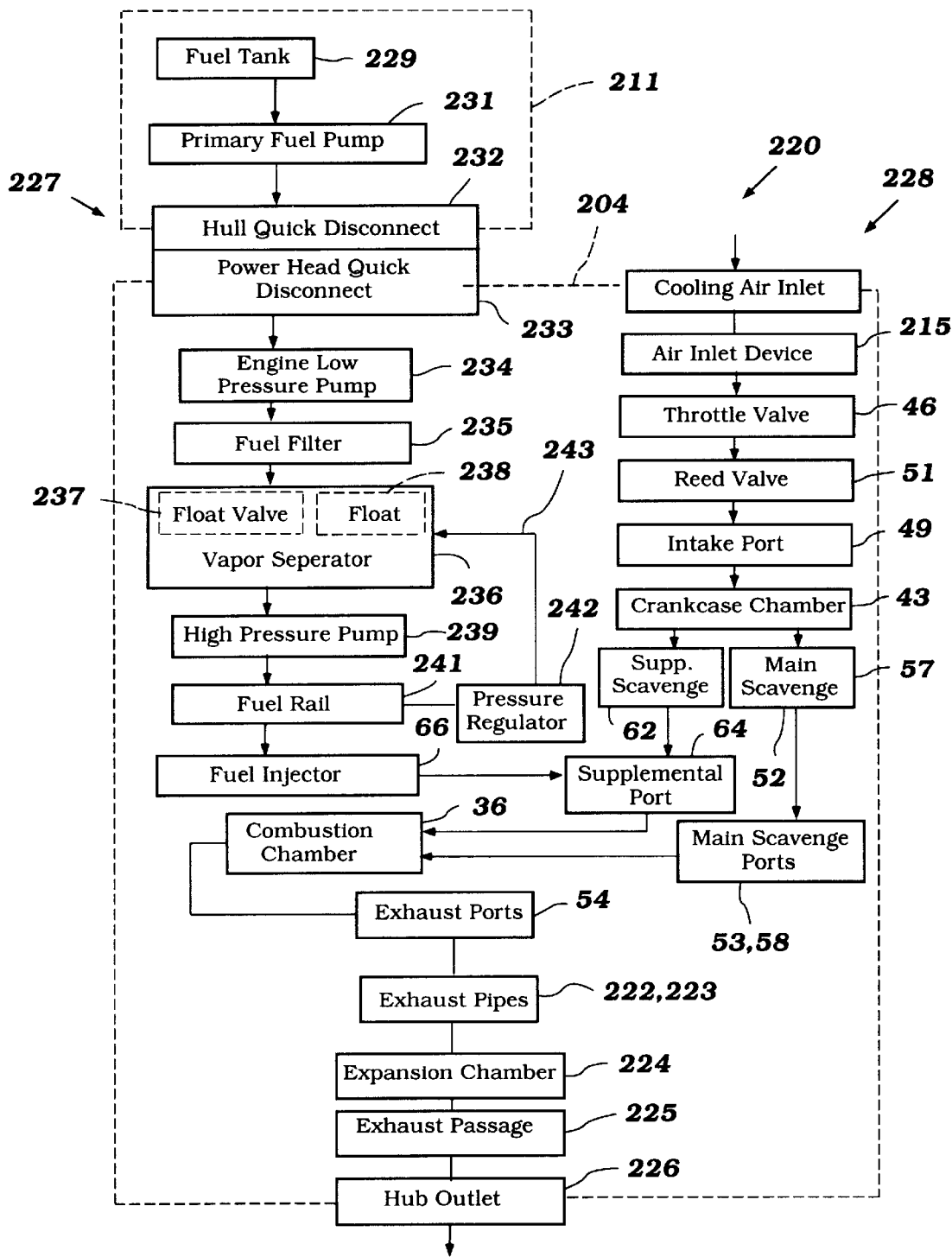
FIG. 22 is a schematic block diagram showing the components of the induction, charge forming and exhaust systems for the engine.

A second, high-pressure fuel pump 239, shown separately in FIGS. 20 and 22, but which actually is preferably mounted within the fuel vapor separator 236, delivers the fuel under pressure to fuel rails 241 associated with each of the cylinder banks 212 and 213. Each fuel rail 241 supplies fuel to the respective fuel injectors 66 of the cylinder banks 212 and 213 in a known manner.

At the ends of these fuel rails 241, there is provided the pressure regulator 242 which regulates the fuel pressure by dumping it back, in this case, into the fuel vapor separator 236 through the return line 243.

The control system for operating the fuel injectors 66 and firing the spark plugs 67 will now be described by primary reference to FIG. 20, wherein a number of the components are shown schematically. There is provided a controller or ECU, indicated generally by the reference numeral 244, to which information is outputted from a number of sensors, as will be described. This ECU 244 also includes a memory that has memorized certain maps of ignition timing and fuel injection timing and duration.

The ECU 244 outputs pulse signals to a solenoid of the fuel injector 66. This solenoid operates the injection valve and controls the timing of beginning of fuel injection and the duration of fuel injection. The timing strategy is as has been described by reference to either FIGS. 5 or 19 depending on the port timing employed and thee location of the injectors 66.

Also, the ECU 244 outputs a signal to an appropriate ignition circuit (not shown) that controls the firing of the spark plugs 67.

The sensors which will be described next are only typical of those sensors which may be employed with the control system and the functions which are sensed. It will be readily apparent to those skilled in the art how the system can be utilized in conjunction with other types of control.

Associated with the engine are certain engine condition sensors. These include a pulsar coil 245 which is associated with the crankshaft 42 and which provides a signal that is indicative of the crankshaft rotational position. By comparing these signals with time, it is possible to measure the actual engine rotational speed.

Engine operator demand or load on the engine may be sensed by a throttle position sensor 246 which, in turn, is associated with the throttle valve 46 so as to provide a signal to the ECU 244 of this condition.

Crankcase pressure is sensed by a pressure sensor 247. It has been found that by measuring crankcase pressure at certain crank angles, it is possible to actually determine the amount of intake air volume. Associated with the intake system may be an intake air pressure sensor and an intake air temperature sensor 248. These sensors provide information on the inductive air for the control purposes.

Among other engine conditions which are sensed is engine temperature, this being sensed by a temperature detector 249 that is mounted so as to be in proximity with a cooling jacket of the engine.

The engine control strategy provided by the ECU 244 may also provide a feedback control so as to adjust the fuel-air ratio. If this is done, an oxygen sensor (not shown) may be provided that samples the combustion product in a position in proximity to one or more of the exhaust port 54.

Also associated with the exhaust system is an exhaust pressure sensor 251. Associated with one or both of the cylinder heads are knock and in cylinder pressure sensors, 252 and 253, respectively, and an exhaust temperature sensor 111.

Because of the marine application, there is also provided sensors for engine control of the CPU 244 that are unique to the such applications. These include a trim angle sensors 254 and a transmission condition sensor 255.

The aforenoted signals and any other desired condition signals are processed by the ECU 244 so as to control the timing of the spark plugs 67 and the beginning and duration of fuel injection as controlled by the injectors 66. As noted any desired control strategy can be employed so long as the fuel injection control meets the aforenoted parameters in connection with the engine timing and timing of opening and closing of the various scavenging ports.

Figure 23:
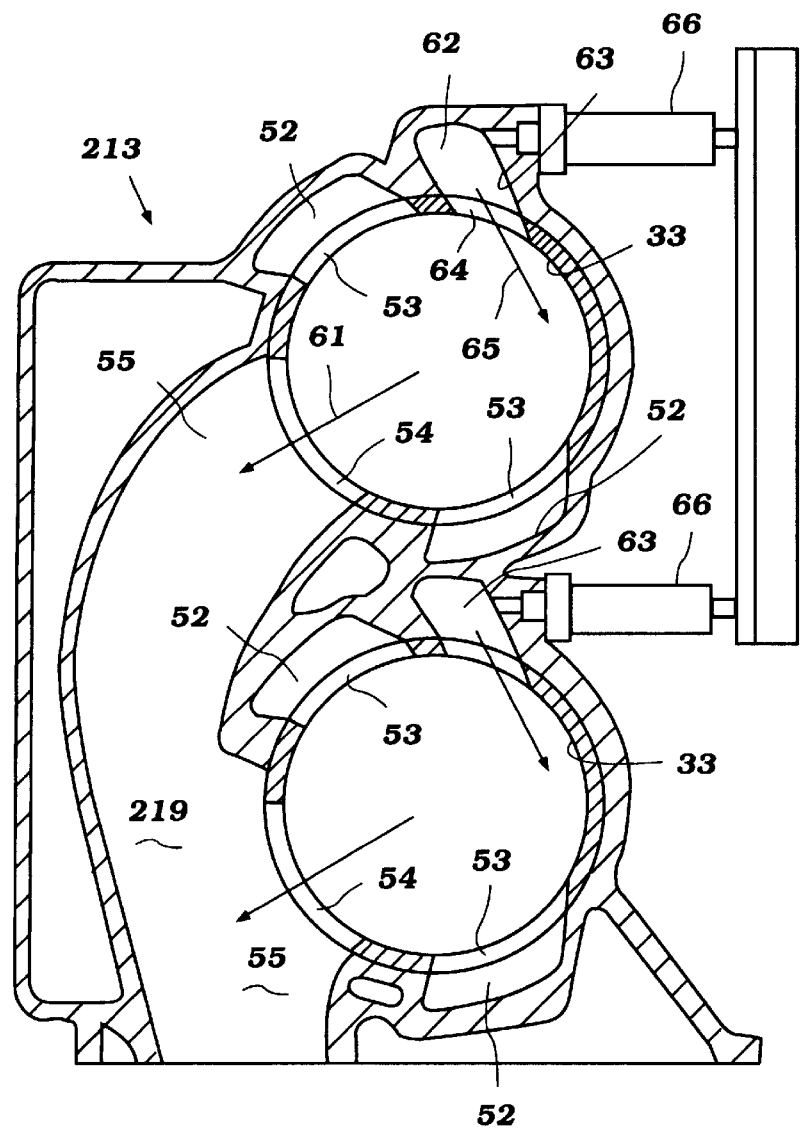
FIG. 23 is an enlarged, partial, cross-sectional view, in part similar to FIG. 21 and showing the porting and fuel injection arrangement associated with one of the cylinder banks of another embodiment.

In all of the embodiments described there has been employed an auxiliary main scavenge port. However the invention may also be practiced in engines not having the auxiliary main scavenge passage and port. FIG. 23 is an enlarged cross sectional view, in part similar to FIG. 21, but where the auxiliary main passage and port have been deleted. Because this is the only difference between this embodiment and the corresponding embodiments already described, only this one figure is necessary to enable those skilled in the art to understand how this concept may be employed with those constructions already shown.

Thus, from the foregoing description, it should be readily apparent that the described embodiments of the invention provide a construction wherein fuel injection may be accomplished through or in proximity to an supplemental scavenge passage and stratification achieved. Of course, the foregoing description is that of preferred embodiments of the invention and various changes and modifications may be made without departing from the spirit and scope of the invention, as defined by the appended claims.

I claim:

1. A two cycle internal combustion engine having a cylinder block defining a cylinder bore, a cylinder head closing one end of said cylinder bore, a piston reciprocating in said cylinder bore and forming with said cylinder head and said cylinder bore a combustion chamber, an exhaust port formed said cylinder bore at the inlet end of an exhaust passage formed in said cylinder block and opened and closed by the reciprocation of said piston, a pair of circumferentially spaced scavenge ports formed in said cylinder bore in spaced relation to said exhaust port and served by respective scavenge passages, said piston having a head portion that defines a dividing wall disposed between said scavenge ports for at least a portion of the stroke of said piston and means for introducing a substantial fuel charge into said combustion chamber on the side of said wall spaced from said exhaust port during at least a portion of the time of said fuel delivery.

2. A two cycle internal combustion engine as set forth in claim 1, wherein there is provided a third scavenge port and passage serving said cylinder bore and spaced circumferentially from each of the pair of scavenge passages.

3. A two cycle internal combustion engine as set forth in claim 2, wherein the third and one of the pair of scavenge passages and associated ports comprise main Schnurle type scavenging passages and ports.

4. A two cycle internal combustion engine as set forth in claim 3, wherein the piston wall extends between the edges of the Schnurle ports adjacent the remaining scavenge port at bottom dead center of the piston.

5. A two cycle internal combustion engine as set forth in claim 1, wherein the flow into the combustion chamber from each of the scavenge passages and ports are in different directions relative to the cylinder bore.

6. A two cycle internal combustion engine as set forth in claim 5, wherein the flow from one of the scavenge ports is initially directed generally across the cylinder bore.

7. A two cycle internal combustion engine as set forth in claim 5, wherein the flow from one of the scavenge ports is initially directed generally axially along the cylinder bore.

8. A two cycle internal combustion engine as set forth in claim 7, wherein the flow from the other of the scavenge ports is initially directed generally across the cylinder bore.

9. A two cycle internal combustion engine as set forth in claim 5, wherein the wall prevents the flow from the scavenge ports from conflicting with each other during at least a portion of the piston movement in the cylinder bore.

10. A two cycle internal combustion engine as set forth in claim 9, wherein the portion of the piston movement is the portion when the scavenge ports are first opened.

11. A two cycle internal combustion engine as set forth in claim 5, wherein the wall redirects the flow from at least one of the scavenge ports.

12. A two cycle internal combustion engine as set forth in claim 11, wherein the wall does not redirect the flow from the other of the scavenge ports.

13. A two cycle internal combustion engine as set forth in claim 5, wherein the wall does not redirect the flow from one of the scavenge ports.

14. A two cycle internal combustion engine as set forth in claim 1, wherein the wall is disposed between the exhaust port and only one of the pair of scavenge ports.

15. A two cycle internal combustion engine as set forth in claim 14, wherein the flow into the combustion chamber from each of the scavenge passages and ports are in different directions relative to the cylinder bore.

16. A two cycle internal combustion engine as set forth in claim 15, wherein the flow from one of the scavenge ports is initially directed generally across the cylinder bore.

17. A two cycle internal combustion engine as set forth in claim 15, wherein the flow from one of the scavenge ports is initially directed generally axially along the cylinder bore.

18. A two cycle internal combustion engine as set forth in claim 17, wherein the flow from the other of the scavenge ports is initially directed generally across the cylinder bore.

19. A two cycle internal combustion engine as set forth in claim 15, wherein the wall prevents the flow from the scavenge ports from conflicting with each other during at least a portion of the piston movement in the cylinder bore.

20. A two cycle internal combustion engine as set forth in claim 19, wherein the portion of the piston movement is the portion when the scavenge ports are first opened.

21. A two cycle internal combustion engine as set forth in claim 15, wherein the wall redirects the flow from at least one of the scavenge ports.

22. A two cycle internal combustion engine as set forth in claim 21, wherein the wall does not redirect the flow from the other of the scavenge ports.

23. A two cycle internal combustion engine as set forth in claim 15, wherein the wall does not redirect the flow from one of the scavenge ports.

24. A two cycle internal combustion engine as set forth in claim 5, further including a fuel injector for injecting fuel for combustion in the cylinder bore.

25. A two cycle internal combustion engine as set forth in claim 24, wherein the fuel injector injects fuel in the path of air flow from one of the scavenge passages and its scavenge port.

26. A two cycle internal combustion engine as set forth in claim 25 wherein the fuel injector injects fuel into the one scavenge passage.

27. A two cycle internal combustion engine as set forth in claim 26, wherein the fuel injector injects fuel in the direction of the one scavenge port.

28. A two cycle internal combustion engine as set forth in claim 25, wherein the fuel injector injects fuel directly into the cylinder bore.

29. A two cycle internal combustion engine as set forth in claim 24, wherein the fuel injector injects fuel directly into the respective cylinder bore through the one scavenge port.

30. A two cycle internal combustion engine as set forth in claim 25, wherein the fuel injector injects fuel adjacent and above the one scavenge port.

31. A two cycle internal combustion engine as set forth in claim 25, wherein the fuel injector is mounted in the cylinder head.

32. A two cycle internal combustion engine as set forth in claim 5, wherein the flow from one of the scavenge ports creates a tumble motion in the cylinder bore.

33. A two cycle internal combustion engine having a cylinder block defining a cylinder bore, a cylinder head closing one end of said cylinder bore, a piston reciprocating in said cylinder bore and forming with said cylinder head and said cylinder bore a combustion chamber, an exhaust port formed said cylinder bore at the inlet end of an exhaust passage formed in said cylinder block and opened and closed by the reciprocation of said piston, a pair of circumferentially spaced scavenge ports formed in said cylinder bore in spaced relation to said exhaust port and served by respective scavenge passages, said scavenge passages being axially positioned in said cylinder bore so that one of said scavenge ports opens and closes before the other, and said piston having a head portion that defines a dividing wall disposed between said scavenge ports for at least a portion of the stroke of said piston and means for introducing a substantial fuel charge into said combustion chamber on the side of said wall spaced from said exhaust port during at least a portion of the time of said fuel delivery.

34. A two cycle internal combustion engine as set forth in claim 33, wherein the upper edge of the other scavenge port has a greater circumferential extent than its lower edge for promoting a large volume of air flow therethrough at the time said other scavenge port is open.

35. A two cycle internal combustion engine as set forth in claim 33, wherein the upper edges of the one scavenge port has a lesser circumferential extent than its lower edge for reducing the flow therethrough.

36. A two cycle internal combustion engine as set forth in claim 35, wherein the upper edge of the other scavenge port has a greater circumferential extent than its lower edge for promoting a large volume of air flow therethrough at the time said other scavenge port is open.

* * * * *